May 13, 1958  T. B. TYLER  2,834,180
TIME INDICATING DEVICE

Filed June 22, 1954  9 Sheets-Sheet 1

TRACY B. TYLER, INVENTOR.

BY

ATTORNEY

May 13, 1958 T. B. TYLER 2,834,180
TIME INDICATING DEVICE
Filed June 22, 1954 9 Sheets-Sheet 2
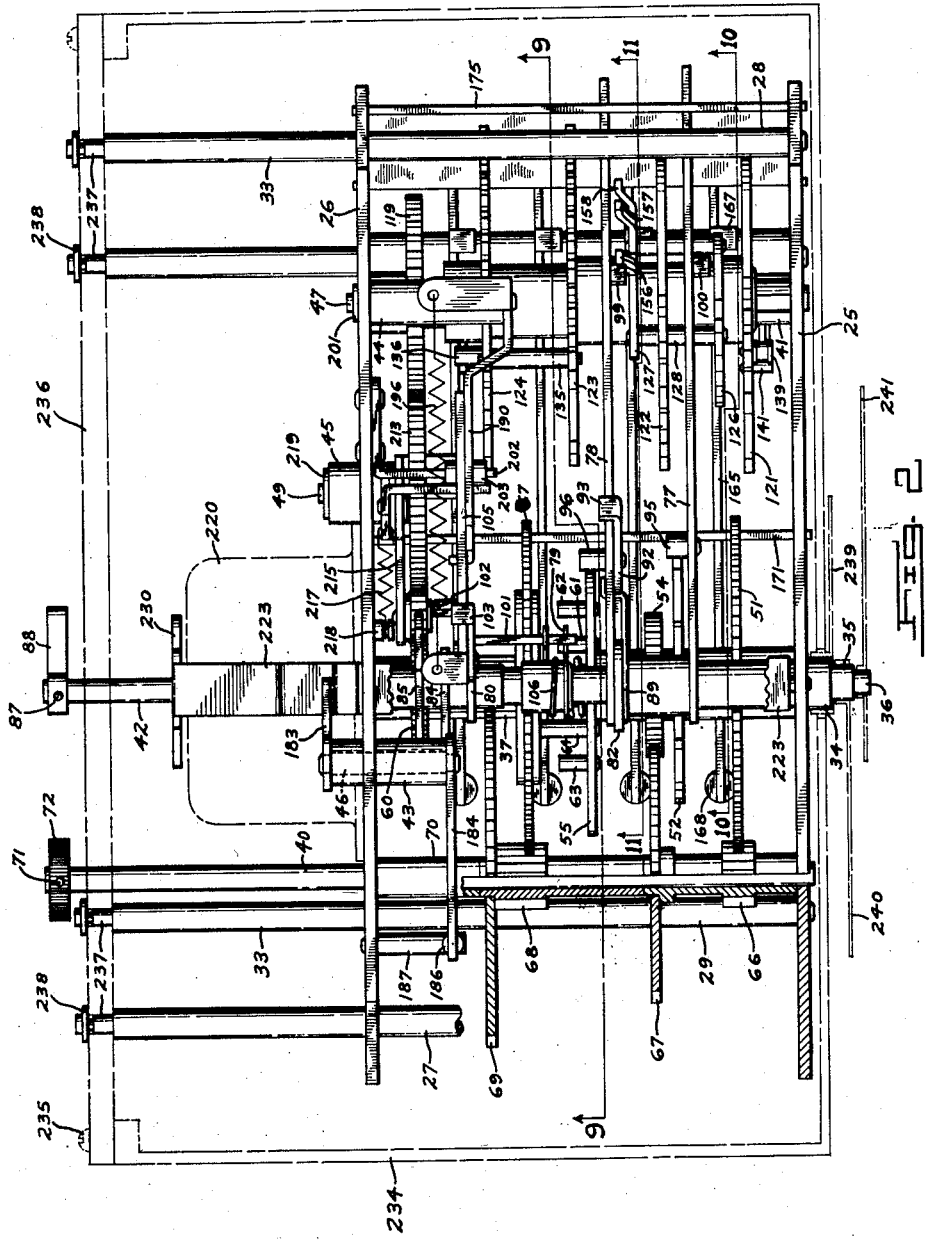
TRACY B. TYLER, INVENTOR.
BY
ATTORNEY May 13, 1958     T. B. TYLER     2,834,180
TIME INDICATING DEVICE
Filed June 22, 1954                                  9 Sheets-Sheet 3
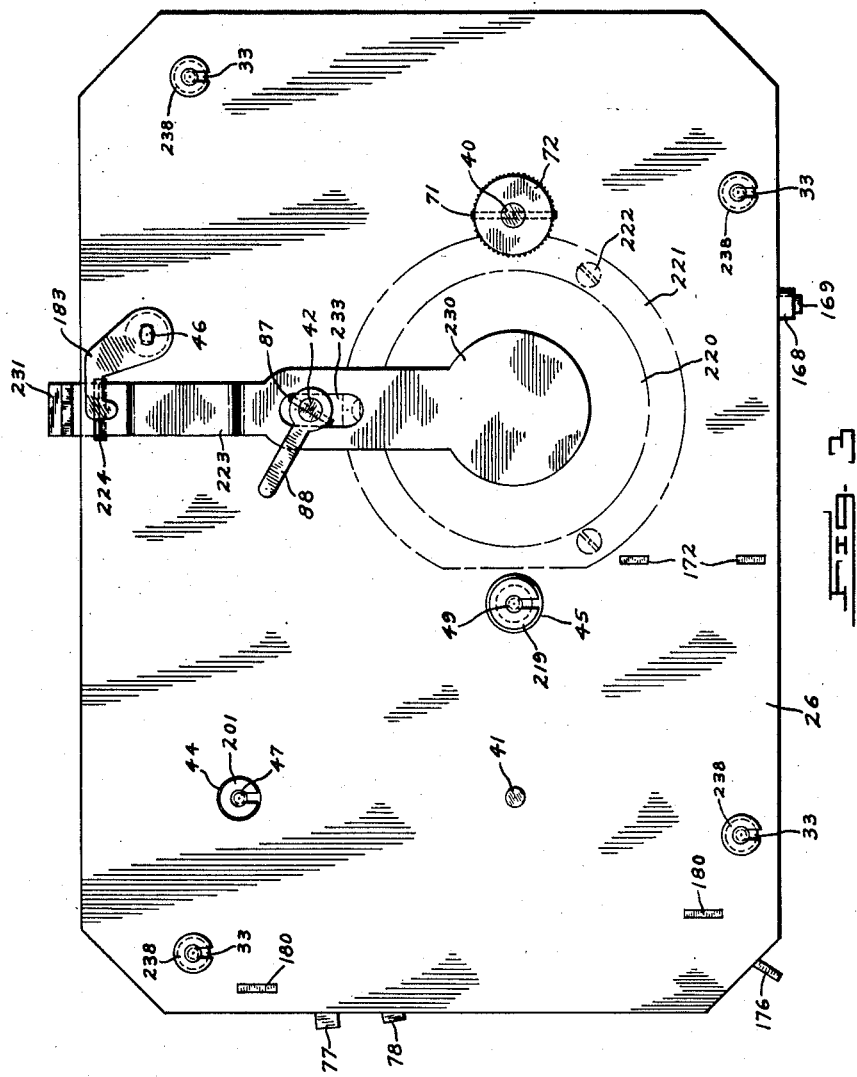
TRACY B. TYLER, INVENTOR.
BY
ATTORNEY May 13, 1958 T. B. TYLER 2,834,180
TIME INDICATING DEVICE
Filed June 22, 1954 9 Sheets-Sheet 4
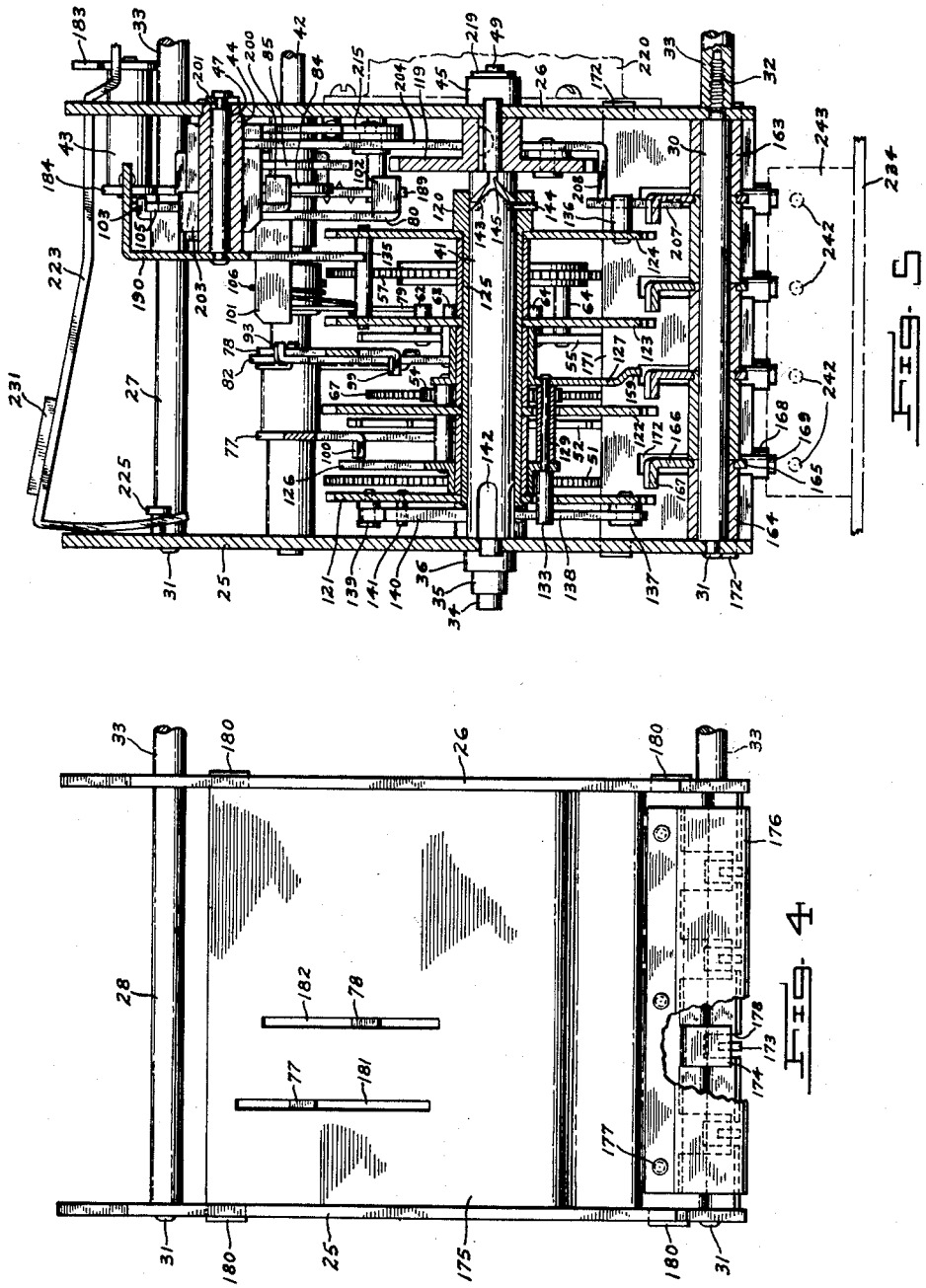
TRACY B. TYLER, INVENTOR.
BY
ATTORNEY May 13, 1958 T. B. TYLER 2,834,180
TIME INDICATING DEVICE Filed June 22, 1954 9 Sheets-Sheet 5

TRACY B. TYLER, INVENTOR.

BY

ATTORNEY

May 13, 1958 T. B. TYLER 2,834,180
TIME INDICATING DEVICE
Filed June 22, 1954 9 Sheets-Sheet 6
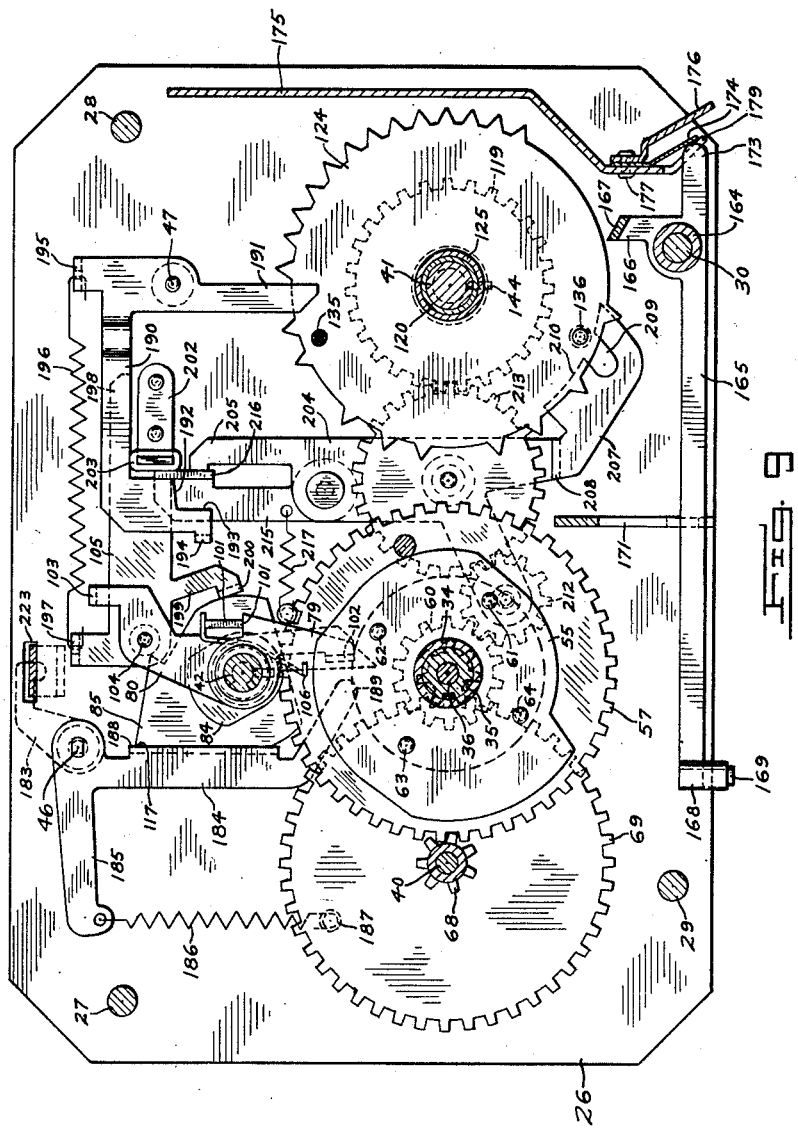
TRACY B. TYLER, INVENTOR.
BY
ATTORNEY May 13, 1958  T. B. TYLER  2,834,180
TIME INDICATING DEVICE
Filed June 22, 1954  9 Sheets-Sheet 7
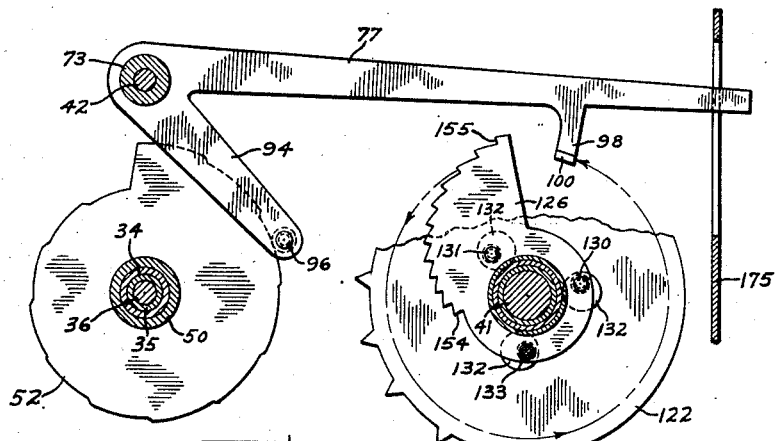
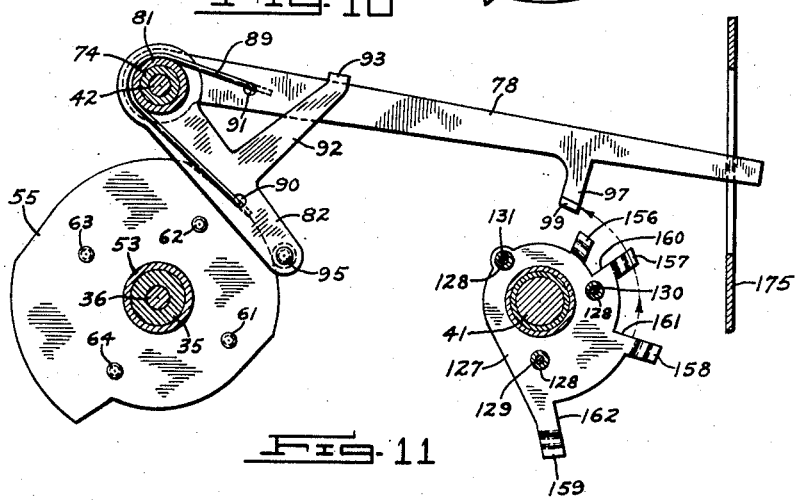
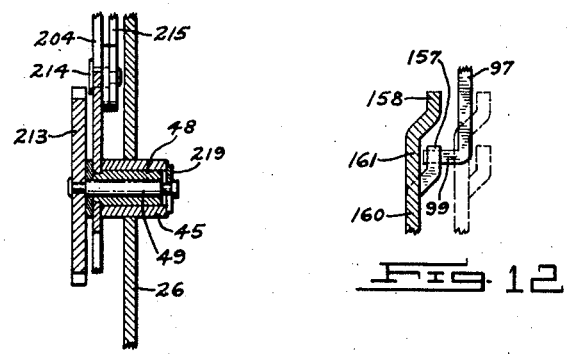
TRACY B. TYLER, INVENTOR.
BY
ATTORNEY May 13, 1958　　　T. B. TYLER　　　2,834,180
TIME INDICATING DEVICE
Filed June 22, 1954　　　　　9 Sheets-Sheet 8
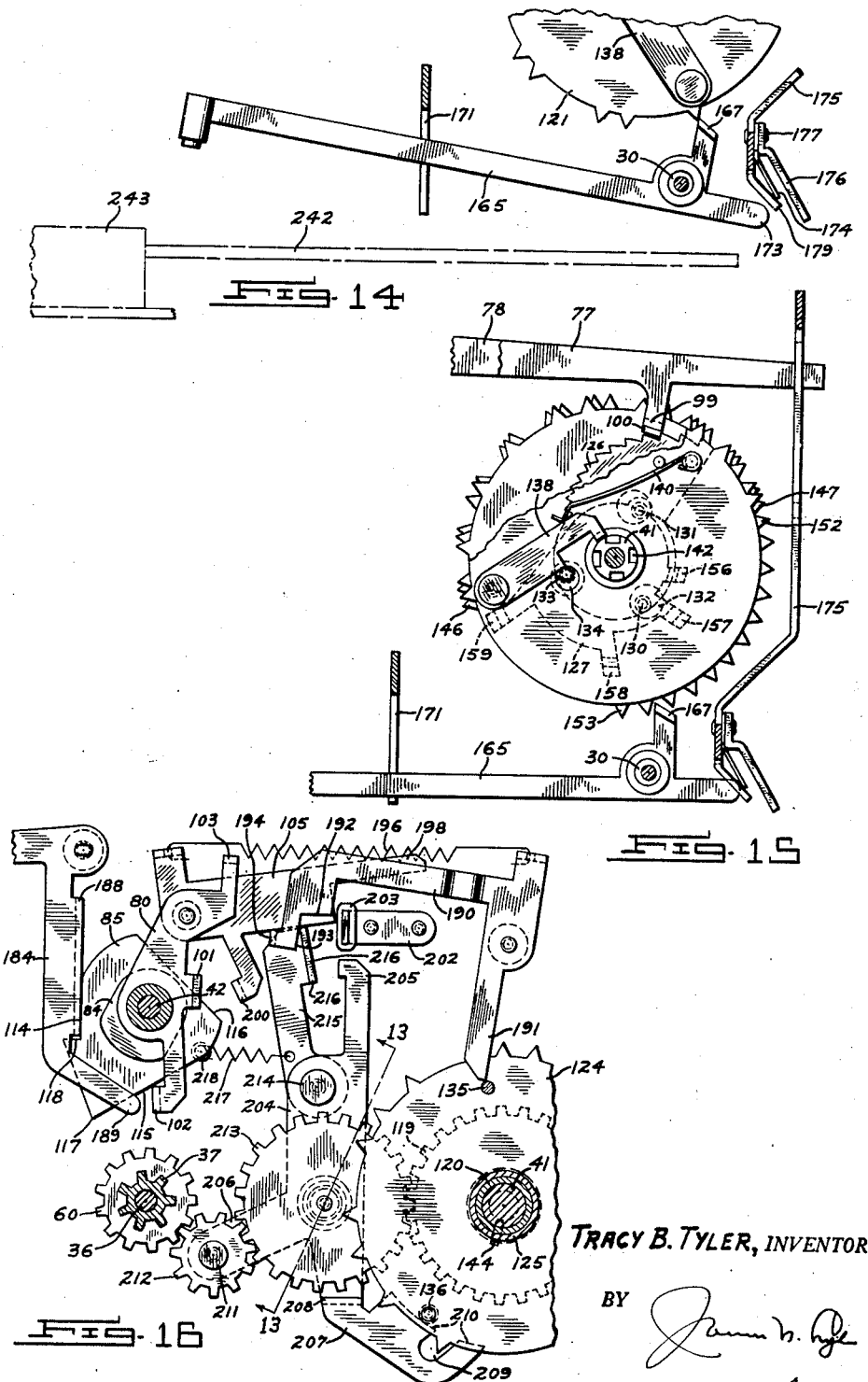
TRACY B. TYLER, INVENTOR.
BY
ATTORNEY May 13, 1958 T. B. TYLER 2,834,180
TIME INDICATING DEVICE
Filed June 22, 1954 9 Sheets-Sheet 9
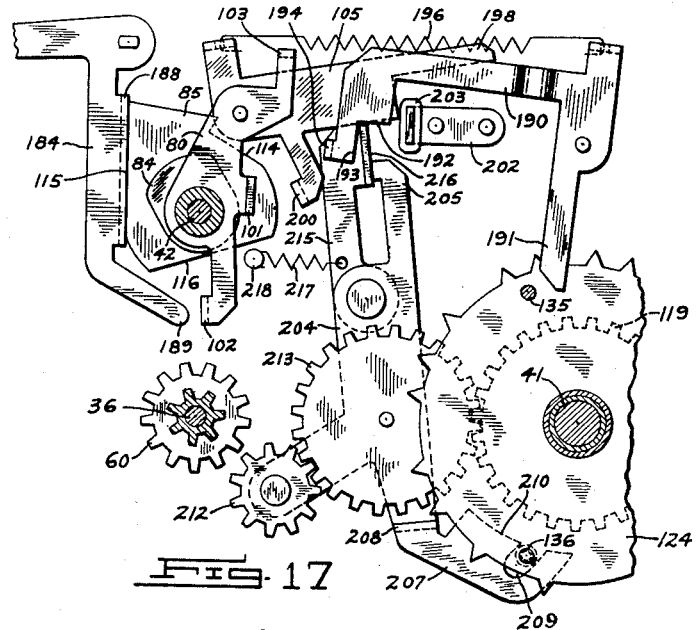
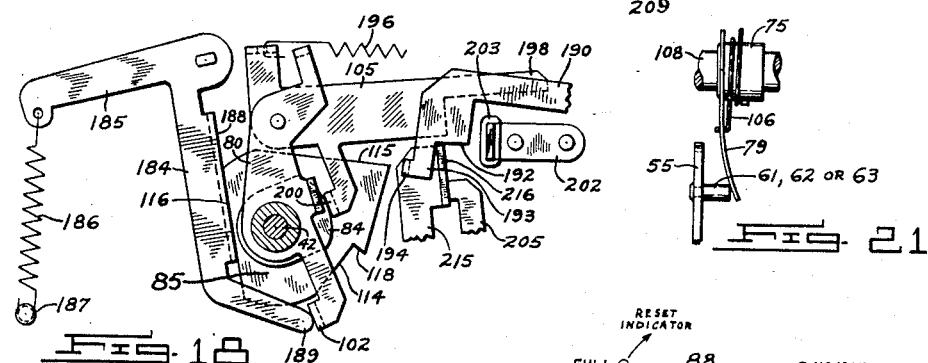
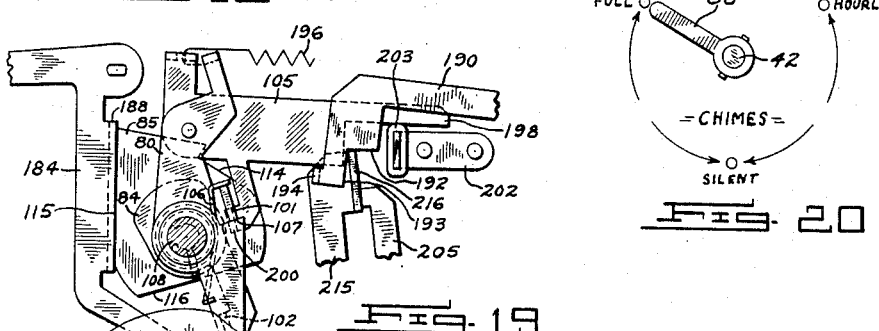
TRACY B. TYLER, INVENTOR.
BY
ATTORNEY _United States Patent Office_

2,834,180
Patented May 13, 1958

2,834,180

TIME INDICATING DEVICE

Tracy B. Tyler, Miami Beach, Fla.

Application June 22, 1954, Serial No. 438,407

46 Claims. (Cl. 58—38)

This invention relates to improvement in devices and apparatus for indicating time. More specifically, it relates to improvement in such devices and apparatus wherewith time is indicated visibly and/or audibly, that is, as with an indiced clock dial and/or by sound, as with chimes, bells, or other audible indicating means, and also in such apparatus wherewith the time may be sounded with an accompanying melody, such, for example, as that commonly known as "Westminster Chimes."

A prime object of the invention is to provide such a device wherein a time-sounding mechanism, which is adapted to sound the hours and fractions of hours, is so co-operatively combined with a timekeeping mechanism that whenever the latter is manually set to the correct time of day with a single manual setting means the time-sounding mechanism automatically remains fully coordinated therewith, and this regardless of whether the timekeeping mechanism is set forward or backward or of the number of minutes or hours it is set in either direction. Heretofore, in such time-sounding apparatus either two separate manual setting means have been required, one for the timekeeping mechanism and the other for the time-sounding mechanism, or in apparatus wherein a single setting means was employed the system required the provision of additional mechanism to eventually coordinate the timekeeping and time-sounding mechanism, and with such additional mechanism the coordination was effected automatically some while after the time was changed by manual setting, not immediately therewith.

Another and important object of the invention is to provide in such a device a structure wherein all of the elements of the timekeeping mechanism, including time visual indicators and the manual time setting means, are carried by and supported on only two axes or shafts.

Still another and important object is to provide in such a device a manually operable selector element whereby the time-sounding mechanism may be adjusted to sound each hour and fractions of the hour, or only each hour, or to remain silent, the selector element being accessible externally of an encompassing casing in which the device may be housed.

Another object is to provide such a device wherein the manual time setting means and/or the time-sounding adjusting selector element may be freely operated while the time-sounding mechanism is in operation or otherwise without detriment or ill effect to any of the elements of the device.

A still further object is to provide in such apparatus a structure wherein all of the operating elements, including the timekeeping mechanism and the time-sounding mechanism, are disposed and supported by and between only two single frame plates instead of the three or four frame plates usually employed in earlier devices of the character herein defined.

Still another object is to provide such a device wherein the entire mechanism is adapted to be driven by a single prime mover, and wherein such prime mover may be either a suitable electric motor or a stored energy device, such as a spring motor comprising a timed escapement means.

A still further object is to provide in such a device, wherein the prime mover is an electric motor, an element to visually indicate whether the current has at any time been interrupted and which element is so designed and constructed that it may be influenced by a very weak magnetic bias through the wall of a housing in which the motor may be enclosed.

Still another object is to provide such a device wherein any objectionable sound or clicking from the starting or stopping of a time-sounding mechanism is substantially eliminated by a single element which is commonly co-operative with several members of the time-sounding mechanism actuating elements.

Another object is to provide in such apparatus improved means for adjusting and maintaining time-sounding strikers in a desired condition relative to the sonic elements when the strikers are at rest and to positively control and restrain the rebound of the strikers.

These and various other objects of my invention will be apparent from the following description wherein reference is made to the accompanying drawings illustrating a certain embodiment of my invention, and wherein similar numerals designate similar parts throughout the several views and figures.

In the drawings:

Figure 2 is a top plan view of the composite structure, a portion of which is partially quarter-sectioned, as on right-angled lines 2—2 of Figure 1, to show the construction of part of the timekeeping gearing.

Figure 3 is a rear elevational view illustrating the construction of the current interruption indicator, the placement of the manual adjusting elements, the termini of the various shafts, etc.

Figure 4 is a right end elevational view (relative to Figure 1) illustrating a guide plate and spring elements which cooperate with time-sounding strikers.

Figure 5 is a vertical transverse sectional view, taken on the staggered line 5—5 of Figure 1, showing, in one condition, a major portion of the time-sounding mechanism and various elements beyond it.

Figure 9 is a vertical horizontal sectional view, taken on the stepped line 9—9 of Figure 2, showing portions of the timekeeping and time-sounding mechanism and, in one condition, the time-sounding mechanism actuating elements.

Figure 10 is a fragmentary vertical horizontal sectional view, taken on the stepped line 10—10 of Figure 2, showing, in one condition, the hour indicating control elements for the time-sounding mechanism.

Figure 11 is a fragmentary vertical horizontal sectional view, taken on the stepped line 11—11 of Figure 2, showing, in one condition, the fractional hour indicating control elements for the time-sounding mechanism.

Figure 12 is an enlarged fragmentary detail view, partly in vertical transverse section, illustrating the cooperational function of certain of the fractional hour indicating control elements.

Figure 13 is a vertical transverse sectional view, taken on line 13—13 of Figure 16, illustrating the construction of the pivotal support for certain of the actuating elements of the time-sounding mechanism.

Figure 14 is a fragmentary detail view illustrating another condition of a portion of the time-sounding mechanism disclosed in Figure 1.

Figure 15 is a fragmentary detail view illustrating still another condition of the time-sounding mechanism disclosed in Figure 1.

Figure 16 is a fragmentary detail view illustrating another condition of the time-sounding mechanism actuating elements disclosed in Figure 9.

Figures 17, 18 and 19 are fragmentary detail views each of which illustrates still another condition of the actuating elements or portions of the actuating elements disclosed in Figure 9.

Figure 20 is a fragmentary detail view illustrating indicia for the time-sounding manual selector element.

Figure 21 is a fragmentary detail view illustrating a structural feature of the trip-finger disclosed in Figure 8.

THE STRUCTURE

Figure 1:
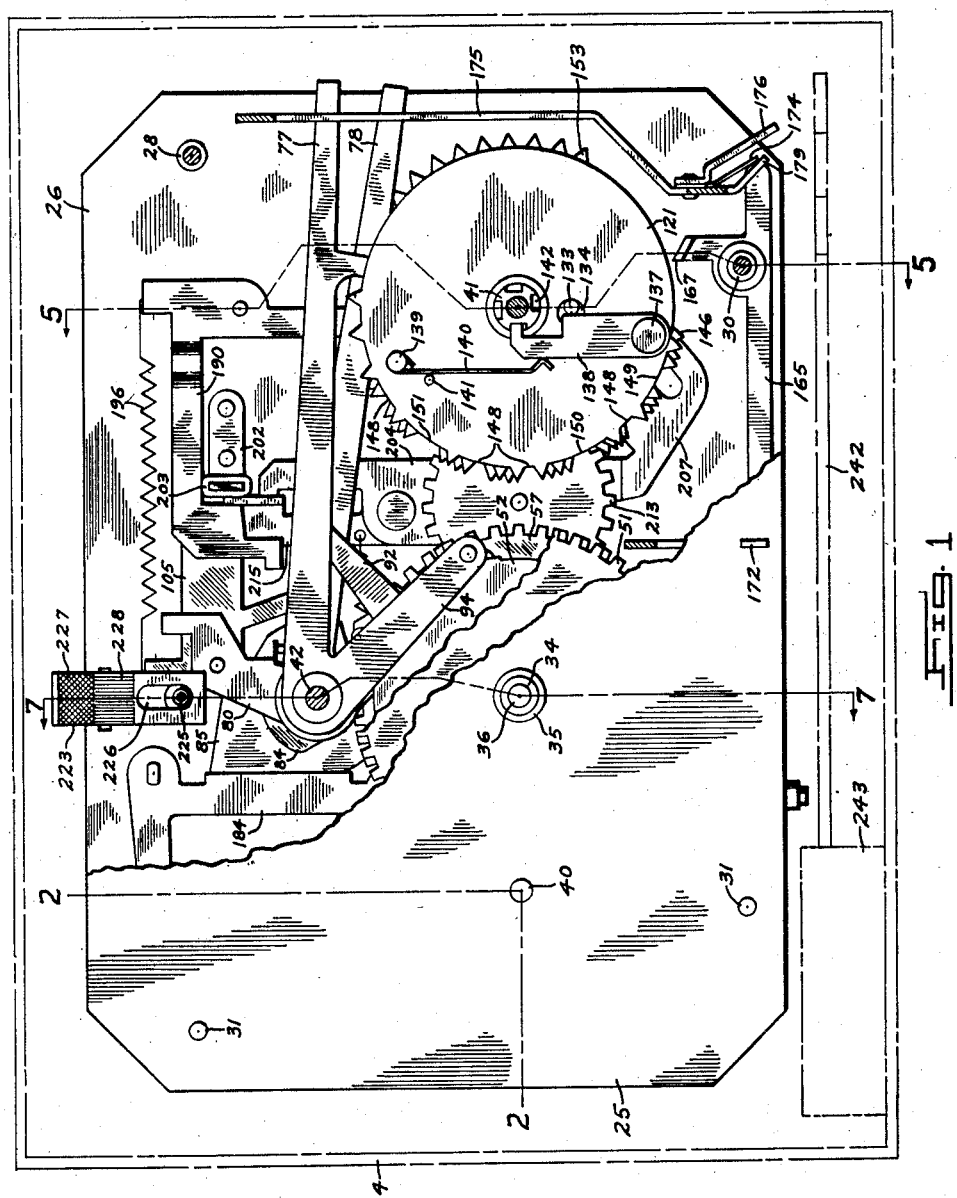
Figure 1 is a front elevational view of the composite structure of the device with two of the elements partly broken away to show a major portion of the operating mechanism and the component elements in general.

Describing now the structure of the presently illustrated embodiment of my invention, and with reference first to Figures 1, 2, 4, 5 and 7, numeral 25 designates a front frame plate and numeral 26 designates a rear frame plate. The plates are rigidly secured together and suitably spaced from one another by means of tie-rods 27, 28, 29 and 30. Each of the tie-rods may be affixed to the front frame plate as by shouldering and rivet heading one end, as at 31, and removably secured to the rear frame plate as by shouldering and externally threading the opposite end, as at 32, to engage corresponding internally threaded ends of rearwardly extended structure supporting rods generally designated 33. Journally supported at one end in frame plate 25 (Fig. 7) is a sleeve bearing 34 which in turn journally supports internally another sleeve bearing 35 and which latter in turn journally supports a portion of a main shaft 36. Affixed to the opposite end of shaft 36, as by press fitting thereon, is a main drive pinion gear 37 formed with a central bore. Removably fitted into a continuing portion of the pinion bore and journally supported in frame plate 26 is a short shaft 38 which cooperates with shaft 36. Thus, as will be seen, elements 34 through 38 are supported one upon or within another to span between the frame plates, shaft 36 being drivingly coupled to shaft 38 as by a cooperating tongue and slot connection 39.

Figure 7:
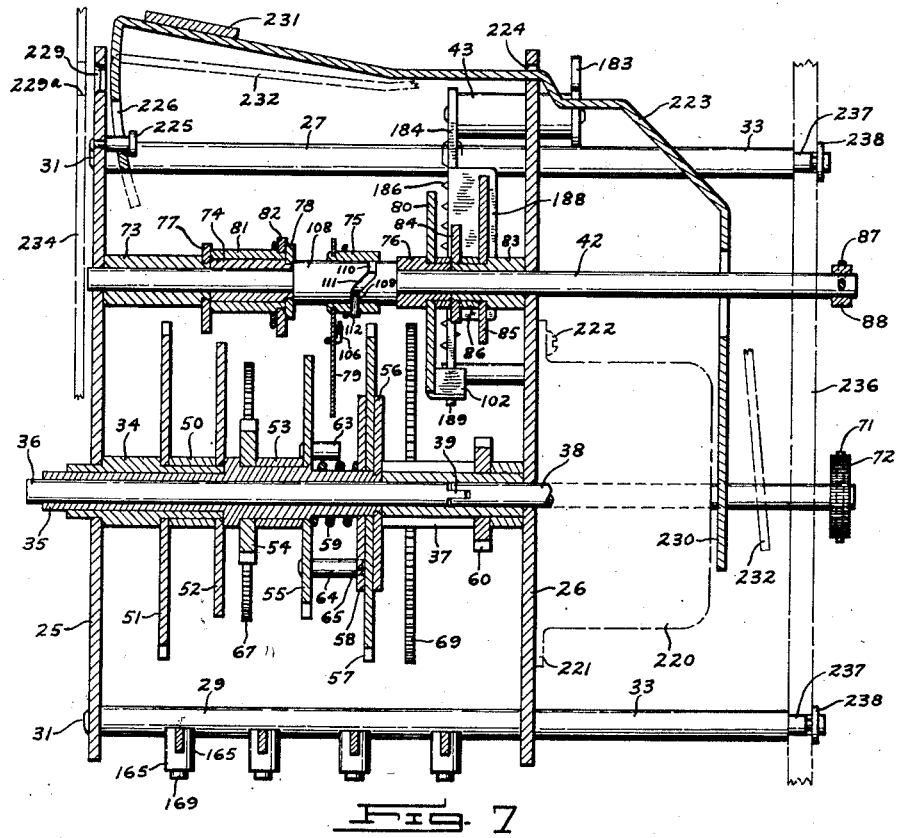
Figure 7 is a vertical transverse sectional view, taken on the staggered line 7—7 of Figure 1, showing portions of the timekeeping mechanism and control elements for the time-sounding mechanism and, in one condition, the trip-finger for actuating the time-sounding mechanism.

Also journally supported by the frame plates 25 and 26 and spanning therebetween is an idler gear shaft 40 (Fig. 2) and a spur wheel unit shaft 41 (Fig. 5), and pivotally supported and spanning therebetween is a control element shaft 42 (Fig. 7).

Suitably affixed to frame plate 26 are bearing bushings 43 (Fig. 2), 44 (Fig. 5) and 45 (Fig. 13) which respectively pivotally support shafts 46 and 47 and a hub bushing 48 which latter in turn pivotally supports a shaft 49.

Describing now the elements carried by the aforesaid shafts, sleeves and bushings, suitably affixed to sleeve bearing 34 and spaced from one another by a spacing collar 50 is a twelve hour interval driven gear 51 and an hour interval cam 52. Suitably affixed to sleeve bearing 35 and spaced from one another by a spacing collar 53 is a twelve hour interval driving gear 54 and a quarter-hour interval cam 55. And suitably affixed to the rear terminus of sleeve bearing 35 is a friction clutch backing plate 56 which cooperates with an hour interval driven gear 57 and a clutch pressure plate 58, the latter two elements being respectively slidably and journally supported on the annulus of the sleeve bearing. Pressure plate 58 is axially biased to frictionally engage gear 57 between it and backing plate 56 by a coil compression spring 59. Suitably affixed to the main drive pinion gear 37 is a time-sounding mechanism drive gear 60, and suitably rigidly affixed to cam 55 (Figs. 2, 7 and 11) is a plurality of angularly spaced axially extended trip-pins 61 and 63 for the quarter-hours, 62 for the half-hour, and 64 for the hour. As will be seen, pin 64 spans the space from the cam to pressure plate 58 in which latter its terminus is engaged in a fitting aperture 65. Thus, pin 64 also serves to restrain the pressure plate from rotation relative to sleeve bearing 35. As will also be seen (Fig. 2), the three other trip-pins terminate some distance from the pressure plate, leaving a clearance space therebetween for a purpose to be later described.

Cams 52 and 55 (Figs. 10 and 11) are formed with substantially equally spaced and progressively radially increased concentrically faced sectors, and, as will be seen, cam 52 is provided with twelve sectors and cam 55 with four. For purposes of later description the lowest sector of each cam will be designated as the first sector, the next higher as the second sector, etc.

Affixed to the idler gear shaft 40 (Fig. 2), as by press fitting thereon, and enmeshed with gear 51, is a drive pinion gear 66 to a shouldered hub extension of which, and enmeshed with gear 54, is suitably affixed a driven idler gear 67. Journally supported on shaft 40, and enmeshed with gear 57, is a drive pinion gear 68 to a hub of which, and enmeshed with pinion gear 37, is suitably affixed a driven idler gear 69. Also provided is a spacing collar 70. The shaft 40, as will be seen, extends some distance to the rear of frame plate 26 and has removably secured to its terminus, as by a pin 71, a serrated setting knob 72.

Pivotally supported on control element shaft 42 (Fig. 7) are hub bushings 73, 74, 75 and 76 which respectively have suitably affixed thereto a time-sounding hour check-finger 77, a time-sounding fraction hour check-finger 78, a time-sounding mechanism starting trip-finger 79, and a trip-finger bell-crank 80 (see also Figs. 10, 11 and 19). Pivotally supported on the annulus of hub bushing 74 is another hub bushing 81 to which is suitably affixed a cam-finger 82. Affixed to shaft 42, as by press fitting thereon, is a hub bushing 83 to which is suitably affixed a release cam 84 and a detent cam 85 which are spaced from one another by a spacing collar 86. The shaft 42 (Figs. 3 and 20), as will be seen, also extends some distance to the rear of frame plate 26 and has removably secured to its terminus, as by a pin 87, a manual selector lever 88.

Cam finger 82 (Fig. 11) cooperates with check-finger 78 through a bow shaped torsion spring 89 the ends of which are bent to engage in apertures 90 and 91 in the cam-finger and check-finger respectively. A side finger 92 has formed at its terminus a tab 93 which projects at a right-angle to overlap and engage the top of finger 78, and the bias of spring 89 normally reacts against the tab. Suitably and rigidly affixed to cam-finger 82, and to a cam-finger 94 of check-finger 77, is an axially extended cam rider-pin 95 and 96 respectively. Also formed in each check-finger respectively (Figs. 5, 10 and 11) is a side finger 97 and 98 the termini of which may be bent at a right-angle to form a check-tongue 99 and 100 respectively.

Formed in bell-crank 80 (Figs. 2 and 5), and projecting at right-angles, or in an axial direction therefrom, is a connection finger 101, an abutment tab 102, and a restraining tab 103. Pivotally supported on the bell-crank (Fig. 9), as by means of a headed stud 104 suitably affixed to the bell-crank, is a throw-latch 105.

Encompassing the hub of trip-finger 79 is a coil torsion spring 106 one end of which is engaged with the trip-finger and the other end with the upper edge of connection finger 101. Trip-finger 79 (Fig. 9) is formed with a projecting heel 107 which is normally biased by spring 106 to engage the lower edge of finger 101.

Figure 8:
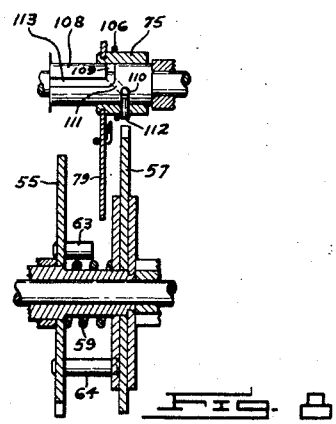
Figure 8 is a fragmentary sectional view, as of Figure 7, but showing the trip-finger in another condition.

Hub bushing 75 (Figs. 7 and 8) is journaled on a diametrically enlarged portion 108 of shaft 42 in the annulus of which is provided a recess formed with axially square or straight end portions 109 and 110 which are offset from one another and connected by an angular or spiral portion 111 of the recess. Suitably affixed to bushing 75 and extending into the recess is a follower pin 112. One end of the recess may terminate with an axially directed open end portion 113 to permit installation or removal of the trip-finger and bushing assembly without extracting the pin 112.

As will be seen (Fig. 16), release cam 84 is formed with only one concentrically radiused rise or high point. Detent cam 85 is formed with two tangential facets 114 and 115 which are equidistant from the axis, and one tangential facet 116 which is a shorter distance from the axis than the others. It will also be seen that a point 117 of the cam extends the greatest distance from the axis. A step 118 forms a restraining catch.

Figure 6:
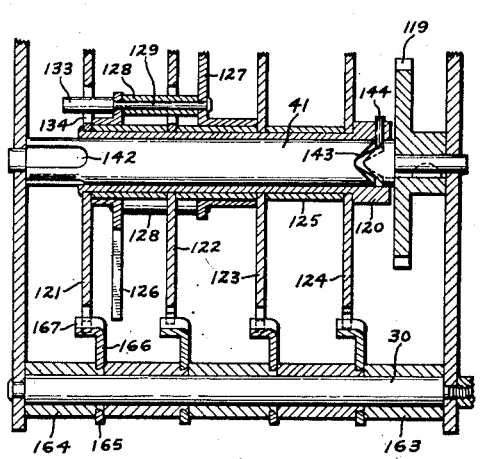
Figure 6 is a fragmentary vertical transverse sectional view, also taken on the staggered line 5—5 of Figure 1, showing, in another condition, the time-sounding mechanism disclosed in Figure 5.

Suitably and removably secured to shaft 41 (Figs. 5 and 6), as by keying to a diametrically reduced end portion thereof, is a driven gear 119. Journally and slidably supported on the main portion of the shaft is a sleeve bearing 120 to which is suitably affixed four sonic element striker operating spur-wheels 121, 122, 123 and 124 which are suitably spaced from one another by spacer collars generally designated 125. Pivotally supported on the annulus of two of the spacer collars (Figs. 6, 10 and 11) is an hour check element 126 and a quarter-hour check element 127 which are rigidly secured together and suitably spaced from one another by spacer tubes generally designated 128 and through-rivets 129, 130 and 131. The spacer tubes span from one check element to the other through clearance apertures generally designated 132 in spur-wheel 122. The head of rivet 129 is elongated to form a pin 133 which extends through a clearance aperture 134 in spur-wheel 121.

Suitably secured at one end to spur-wheel 123 and at the other end to spur-wheel 124 is a release trip-pin 135, and suitably rigidly affixed to and axially extended from the rear face of spur-wheel 124 is a detent and secondary release pin 136.

Pivotally supported on the front face of spur-wheel 121 (Fig. 1), as by a headed stud 137, and cooperative with pin 133 is a shaft latch 138, and suitably affixed to the wheel face, as by a headed stud 139, is a cantilever spring 140 which reacts against a fixed stud 141 to bias the latch toward engagement with the shaft. Provided in the annulus of shaft 42 to cooperate with the latch are four axially directed recesses generally designated 142. Also provided in the annulus of the shaft (Fig. 5) is a spiral or angular recess 143 in which the direction of the spiral or angle is reversed at each quarter turn of the shaft. Suitably affixed to sleeve bearing 120 and projected into the recess is a follower pin 144. It is to be observed that when latch 138 is properly engaged with any one of the recesses 142 the pin 144 is so positioned radially in the sleeve 120 that it coincides with one of the points of angular reversal of the recess 143. To permit installation or removal of the assembly comprising sleeve 120 without extracting pin 144 one or both of the rearward reversal points of the recess may be continued with an axially directed open end recess 145.

Formed on the periphery of the four spur-wheels collectively (Figs. 1 and 15) is a plurality of striker operating spurs of which the first and last of one specific series is designated 146 and 147 respectively. In the present structure it will be seen that this first series of spurs comprises ten clusters of four spurs each which in turn constitute four groups comprising one, two, three and four clusters consecutively, the clusters being separated by relatively short spaces generally designated 148 and the groups by longer spaces 149, 150 and 151, the latter also defining quarter-hour check points as will later be described. Of the four spurs in each cluster each one may be on a different wheel or two or more may be on the same wheel, but however situated they will in combination usually be equally spaced circumferentially and relatively consecutive in one order or another. Such a system may, for example, be arranged to effect the chiming sequence commonly known as "Westminster Chimes."

Formed on the periphery of spur-wheels 123 and 124 is another group of spurs, the first designated 152 and the last 153. This group comprises twelve spurs on each wheel which are equally spaced circumferentially and axially aligned with each other on the two wheels. These spurs constitute a group for sounding the full hour intervals.

Hour check spur element 126 (Fig. 10) is formed with twelve check-teeth, the first designated 154 and the last 155, each tooth being progressively and substantially uniformly a greater radial distance from the axis and correspondingly circumferentially spaced relative to the twelve spurs of the hour sounding group 152—153.

Quarter-hour check element 127 (Fig. 11) is formed with four check-prongs 156, 157, 158 and 159 each of which is offset in the axial direction (to the rear) as shown in Figures 2 and 12. It is also formed with three straight (non-offset) check-steps 160, 161 and 162. Each of the check-prongs and check-steps are also progressively and substantially uniformly extended a greater radial distance from the axis and are correspondingly circumferentially spaced relative to the spaces 149, 150 and 151 of the spur wheel groups.

Tie-rod 30 also serves as a shaft, and journally supported thereon and axially maintained by a spacer collar 163 are four hub bushings, generally designated 164 (Figs. 5, 6 and 9), to which are suitably affixed four sonic element strikers generally designated 165. Formed on each striker is a finger 166 the terminus of which may be bent at a right-angle to form a lift-tongue 167 which is adapted to cooperate with the wheel spurs previously described. The strikers are in the form of arms which may extend some distance radially from their supporting axis and have affixed to their terminus a suitably weighted head 168 which may be provided with a striker face of some suitably soft material such as leather or felt.

Spanning from one to the other of the frame plates 25 and 26 and supported therebetween by fitted tongues and apertures 170 is a striker alignment guide plate 171 which is formed with rectangular apertures 172 through which the striker arms extend with some measure of side clearance. The guide plate is preferably located about midway between the striker head and the striker axis, or closer to the head, and serves to prevent the strikers from being accidently bent out of alignment with the sonic elements they are disposed to strike.

A finger 173, extending from the strikers on the side of the axis opposite from the headed end, is provided to cooperate with cantilever type spring tabs, generally designated 174, which serve to yieldably sustain the strikers in the position shown in Figure 9. The spring tabs, of which there are four in the present embodiment, may be formed in one piece, as shown in Figure 4, and may be secured to an end plate 175 under a guard flange 176 as by rivets 177. The end plate may be provided with slotted apertures 178 wherethrough the fingers 173 engage the spring tabs, and the latter are preferably preloaded to a predetermined bias which is obtained by the abutment of the spring ends with plate 175 at 179.

Plate 175 is supported by and between frame plates 25 and 26 by fitted tongues and apertures 180, and, as will be seen, plate 175 is also provided with elongated guide apertures 181 and 182 which serve as end guides for the check-fingers 77 and 78. The guard flange 176 serves to prevent the spring tabs 174 from being accidently overstressed or bent outwardly far enough to destroy their required reaction bias.

Suitably affixed to one end of shaft 46 (Figs. 2 and 9) is an indicator reset-finger 183, and suitably affixed to the opposite end of the shaft is a detent arm 184 which comprises a finger extension 185. A coiled tension spring 186, semi-diagrammatically illustrated, is secured at one end to the finger 185 and at the opposite end to a stud 187 which is suitably affixed to frame plate 26. Under the bias of the spring the finger 185 and hence the detent arm 184 is urged to rotate counterclockwise as viewed in Figure 9. Formed at a right-angle on the detent arm is an elongated flat faced detent tab 188 which is adapted to cooperate with detent cam 85 (Figs. 17–19). The rounded terminus 189 of the angled end portion of the detent arm is adapted to cooperate with the abutment tab 102 of bell-crank 80.

Suitably affixed to shaft 47 (Figs. 5 and 9) is a keep-latch 190 which comprises a release finger 191, a rest step 192, and a stop-catch 193. Formed at a right-angle on the stop-catch is a lift-tab 194 which extends under and is adapted to cooperate with throw-latch 105. Formed at a right-angle on the keep-latch body is a tab extension 195 to which is secured one end of a coil tension spring 196, illustrated semi-diagrammatically. The opposite end of the spring is secured to a similar tab extension 197 formed at a right-angle on throw-latch 105. The throw-latch also comprises a rest finger extension 198 and a release finger extension 199. Formed at a right-angle at the terminus of the latter is a cam rider-tongue 200 which is adapted to cooperate with release cam 84. The keep-latch 190 may be axially retained as by a snap-ring 201 engaged in a fitting annular recess in the shaft.

Suitably affixed to frame plate 26, and formed at a right-angle to extend forwardly therefrom, is a stop-rest bracket 202. Provided on the bracket and suitably secured thereto is a cushioning element 203 which may be composed of some sound absorbing material such as leather, felt, pliable plastic, or the like.

Suitably affixed to hub bushing 48 is a clutch-gear, detent and latch-catch carrier 204 (Fig. 16) which comprises a catch abutment finger 205, a clutch-gear arm 206, and a detent arm 207. The latter arm is offset toward spur-wheel 124 (Figs. 5 and 16) by two right-angle bends at 208 and is formed with a U slot 209 and an edge radius 210. The radius is concentric with the axis of shaft 41 when the arm is in the position shown in Figures 9 and 16, and the radius and the U slot are adapted to cooperate with detent pin 136.

Journally supported on arm 206, as by means of a headed stud 211 suitably affixed to the arm, is a clutch-gear 212 which is adapted to be engaged with or disengaged from drive gear 60. Suitably affixed to shaft 49 is an idler gear 213 which is enmeshed with gears 212 and 119.

Pivotally supported on carrier 204, as by means of a headed stud suitably affixed thereto, is a latch-catch 215 which at its free end is formed at a right-angle to provide a catch-tongue 216 which is adapted to cooperate with throw-latch 105 and keep-latch 190. A coil tension spring 217, semi-diagrammatically illustrated, is secured at one end to the latch-catch and at the opposite end to a stud 218 which is suitably affixed to frame plate 26. Under the bias of the spring the carrier 204 and the catch 215, together or independently, are urged to rotate counterclockwise as viewed in Figure 9. The carrier and its associated elements may be axially retained as by a snap-ring 219 (Fig. 13) engaged in a fitting annular recess in shaft 49.

The complete working mechanism is adapted to be driven by a suitable prime mover connected to shaft 38 which in the present structure is designed for operation at 1 R. P. M. However, the type of prime mover to be employed in the present structure is no part of this invention and is therefore only diagrammatically illustrated and is designated by numeral 220. For example, the prime mover may be a synchronous electric motor with an output shaft governed at 1 R. P. M. or a spring motor with a built-in escapement mechanism which governs the output shaft at 1 R. P. M. And it may be provided with a flange, such as 221, by which it may be secured to frame plate 26 as by screws 222.

If an electric motor is employed a current interruption indicator element such as 223 (Figs. 1 and 7) may be provided. This may extend through an aperture 224 in frame plate 26 wherein it is supported as on a balance fulcrum and wherein it may be retained endwise as by a headed stud 225 which is engaged in a free fitting elongated aperture 226 in an extension of its indicating face, the stud being suitably affixed to frame plate 25. The indicating face of the element may be coated with two colors, such as red and silver, represented by crossed lines 227 and vertical lines 228, respectively, which may be viewed through suitable apertures such as 229 in frame plate 25 and 229a in the front panel of a casing which is later to be described.

The terminus of the indicator element adjacent the motor may be enlarged, as at 230 (Fig. 3), to present an area of magnetically permeable material great enough to be functionally influenced by a very weak magnetic flux. While operating current is being supplied to the motor and the indicator element has been manually set in the position shown by solid lines in Figure 7 (by means later to be described) it will be sustained in such position under influence of the electro-magnetic field of the motor until the current is interrupted. A counterbalancing weight 231 may be suitably affixed to the element whereby the balance is such that when the current is interrupted even momentarily the weighted end will fall causing the element to assume the position indicated by the broken lines 232, and it will remain in this position until it is manually reset after current has been restored. An elongated clearance aperture 233 may be provided in the indicator element wherethrough shaft 42 may freely extend as shown.

If the prime mover is not electrically operated the indicator element may be omitted.

The present structure, including the sonic elements, is adapted to be enclosed in a suitable housing or casing. However, since the specific type or design of the casing and sonic elements form no part of the present invention they are illustrated only diagrammatically. For example, the casing may comprise a main cabinet 234 (Figs. 1 and 2) to which may be secured, as by screws 235, a rear panel 236. The operating structure may be secured to and supported by the rear panel by shouldered end portions, generally designated 237, of supporting rods 33 which may be retained by snap-rings 238 engaged in a fitting annular recess in the rods. The shafts 40 and 42 may extend through the rear panel as shown, the setting knob 72 and selector lever 88 being disposed externally of the casing, and relative to the lever the rear panel may be inscribed as illustrated in Figure 20.

Sleeve bearings 34 and 35 and shaft 36 may extend through a suitable aperture in the front panel of the casing as shown and have secured to them an hour hand 239, a minute hand 240, and a second hand 241, as diagrammatically illustrated. And the front panel of the casing may be suitably inscribed with time indicia (not shown) relative to the hands.

The sonic elements may be of the straight rod type, as 242, supported at one end in a weighted holder, as 243, which may be suitably secured to the bottom panel or floor of the casing. In the present embodiment of the invention four sonic elements or rods may be employed, each tuned to a different sound pitch or musical note.

*Operation*

Describing now the operation of my invention, recital will first be directed to the timekeeping mechanism, best seen in Figures 2 and 7. Shaft 38, by its connection with a suitable prime mover, will be rotated clockwise, as viewed in Figures 1 and 9, at 1 R. P. M. Through its connection at 39 with shaft 36 the latter and pinion gear 37 will also revolve at 1 R. P. M., and the first gear drive is from pinion gear 37 to idler gear 69 and in turn from pinion gear 68 to hour interval gear 57 which latter rotates sleeve 35 accordingly. The next gear drive is from driving gear 54 to idler gear 67 and in turn from pinion gear 66 to twelve hour interval gear 51. The ratio between gears 37 and 69 is preferably 7.5 to 1, and between gears 68 and 57 it is preferably 8 to 1, the overall ratio thus being 60 to 1, wherewith sleeve 35 is rotated at 1 R. P. H. The ratio between gears 54 and 67 is preferably 1.5 to 1, and between gears 66 and 51 it is preferably 8 to 1, this overall ratio thus being 12 to 1, wherewith sleeve 34 is rotated at 1/12 R. P. H. It should be stated that to facilitate drawing and for the sake of clarity the gear diameters are not drawn to actual scale proportions and the teeth are shown coarser than they are in practice.

From the foregoing it will now be seen that cam 55 rotates at 1 R. P. H. while came 52 rotates at 1/12 R. P. H.

For adjusting or setting the time the shaft 40 may be manually revolved by the setting knob 72. When this operation is performed gear 68, being free on the shaft, will be unaffected while with gear 66, which is fixed to the shaft, the gears 54 and 51 will be revolved as required, the clutch plates 56 and 58 allowing gear 57 to slip between them under the manually applied increased torque.

Describing now the actuation and operation of the time-sounding mechanism observance will first be taken of the detent cam 85. With reference to Figure 20 it will be seen that by manual rotation of shaft 42 by means of the selector lever 88 the cam may be selectively set in any one of three positions inscribed on the casing rear panel and designated "Full," "Silent" and "Hourly." Each of these positions of the lever brings one of the tangential faces 115, 116 or 114, respectively, of cam 85 into abutment with the tab 188 of detent arm 184 which, under the bias of spring 186, retains the cam and hence shaft 42 in the selected position. When the lever is set at "Full" the trip-finger 79 will be moved axially by recess 111 to the position shown in Figure 7 and when set at "Hourly" the trip-finger will be moved to the position shown in Figure 8. The effect of these settings will presently be described. At the setting designated "Silent" the axial position of the trip-finger will be of no importance, but other conditions are established which also will presently be described.

With reference to Figures 9 and 19 the time-sounding mechanism actuating elements will be seen to comprise the trip-pins 61, 62, 63 and 64, the trip-finger 79, spring 106, bell-crank 80, throw-latch 105, keep-latch 190, spring 196, bracket 202, carrier 204, and latch-catch 215. With lever 88 set at "Full" and trip-finger 79 thus in the axial position shown in Figure 7 it will be seen that the latter is aligned to cooperate with any one of the trip-pins 61, 62, 63 or 64. Referring now to Figure 19, and describing first the fractional hour time-sounding, it will be seen that with clockwise rotation of the cam 55, as viewed in the drawing, the trip-pin 62 has engaged and rotated the trip-finger and hence bell-crank 80 counterclockwise against the bias of spring 196 to a point where the trip-pin is about to release the finger. In this rotation of the trip-finger the pin 112 moves only in the straight end portion 109 of the shaft recess and therefore is not displaced axially. In the condition shown the throw-latch 105 has been drawn back sufficiently far so that its latch point (also under the bias of spring 196) has dropped behind and below catch-tongue 216, its finger extension 198 now resting on the cushioning element 203 of rest bracket 202. Now, with reference to Figures 1 and 9, when the trip-pin passes and releases the trip-finger the following actions occur: Under the influence of spring 196, the bias of which is superior in effect to that of spring 217, the throw-latch 105 rotates the latch-catch 215 and hence the carrier 204 clockwise, as viewed in the drawings, until the catch-tongue 216 is stopped by its abutment with the cushioning element of rest bracket 202. Thereupon the keep-latch 190, also under the influence of spring 196, drops to rest upon the cushioning element and into engagement with catch-tongue 216 to thereby positively sustain the carrier in its now effected condition, and with the carrier in this condition the U-slot 209 has become free of pin 136 and gear 212 has become enmeshed with driving gear 60, as shown. It will be observed that in the foregoing actions the throw-latch, keep-latch and catch-tongue each come to rest on or against the one cushioning element 203 which serves to substantially eliminate any objectionable clicking sounds which might otherwise accompany the actions.

With the actuating mechanism now in the condition shown in Figures 1 and 9 shaft 41 and the assembly of operating elements it carries (which will hereinafter be designated as the "operating assembly") are set to rotating counterclockwise, as viewed in the drawings, by the drive from gear 60 through gears 212 and 213 to gear 119. At this time the operating assembly is axially positioned to the left on shaft 41, as viewed in Figure 5, and in this position, as will be seen, the spurs of all the wheels 121—124 are clear of and thus non-cooperative with the tongues 167 of strikers 165. As hereinbefore described trip-pin 62, which has just now effected the actuating mechanism, is the pin designated for the sounding of the half-hour. With reference now to Figure 11 it will be seen that with cam 55 rotated to the position shown in Figure 19 (being the same as in Figure 11) the rider-pin 95 of cam-finger 82 is resting against the second sector of the cam. In this condition check-finger 78 is so positioned that its check-tongue 99, as indicated by the broken line with arrowheads, is radially aligned to cooperate with prong 157 and step 161 of check element 127. The cooperative system is also illustrated as viewed on a straight line and enlarged in Figure 12. When the operating assembly has rotated sufficiently far to bring the prong 157 into abutment with check-tongue 99 the spur-wheels 121—124 will be so positioned radially that the space 149 (Fig. 1) between the spur groups will be aligned midway with the left edge (as viewed in the drawings) of the tongues 167 of the strikers. Now, with continued rotation of shaft 41 the following actions will occur: The prong 157 (Fig. 11) reacting against check-tongue 99 will bias pin 133 to release latch 138 from the shaft recess 142 with which it is presently engaged and with continuing abutment of the prong and check-tongue the operating assembly will be checked against rotation while shaft 41 continues to revolve. Therewith, follower pin 144, tracking the shaft recess 143, will shift the assembly to the right until at one-quarter turn of the shaft the assembly has been moved to the position shown in Figure 6 wherewith the spur-wheels are aligned to cooperate with the lift-tongues 167 of the strikers. Prong 157 will now have traversed the length of check-tongue 99 and will have slipped off the heel of the latter to the position illustrated by broken lines in Figure 12. Latch 138 is now free again and under the bias of spring 140 becomes engaged with the succeeding recess 142. Shaft 41 and the operating assembly now again revolve unitarily and the spurs of the wheels cooperating with the lift-tongues 167, as illustrated in Figure 14, will successively lift and drop the several strikers 165 to strike and activate the sonic elements 242. The assembly will continue to revolve until the check-step 161 of the check element abuts check-tongue 99 wherewith the space 150 between the spur groups will be radially aligned with the left edge of tongues 167. Now, in the same manner as just described, latch 138 is again released and the operating assembly, by virtue of the opposite incline of shaft recess 143, is with another quarter-turn of shaft 41 shifted back to the position shown in Figure 5, and therewith the step 161 of the check element has traversed back to slip off the toe of check-tongue 99 to the position illustrated in solid lines in Figure 12 and latch 138 now becomes engaged with the next recess 142.

Shaft 41 and the operating assembly now continue to revolve unitarily until trip-pin 135 abuts the release finger 191 of keep-latch 190, and thereupon the following actions occur: The keep-latch is rotated clockwise, as viewed in the drawings, until it assumes the position shown in Figure 16 wherewith its latch point has become disengaged from catch-tongue 216 and wherewith its lift-tab 194 has also lifted and disengaged throw-latch 105 from the catch-tongue. With the latter action the throw-latch is pulled forward by spring 196 to where it is stopped as shown when its latch point abuts the cushioning element 203 while it rests upon the upper edge of catch-tongue 216. Under the bias of spring 217 the latch-catch 215 is now rotated counterclockwise until its catch-tongue 216 comes into abutment with the stop-catch 193. Now, under the continuing bias of spring 217 the carrier 204 is urged to rotate counterclockwise—the edge corner of catch-tongue 216 functioning as a fulcrum point against the stop-catch 193 leaving the spring bias effectively reactive against the pivot stud 214—but, for the moment the carrier is restrained from such rotation by the detent pin 136 which is now in abutment with and riding on the edge radius 210 of detent arm 207. With further rotation of the operating assembly the pin 135 will pass and free the release finger 191, and therewith the rest-step 192 of latch 190 will come to rest on the upper edge of tongue 216, as shown. Rotation of the assembly now continues until the position of pin 136 coincides with the U-slot 209, thereupon the carrier 204 is freed to rotate to its released condition, which is as shown in Figure 17. Gears 60 and 212 are now disengaged and pin 136 has become engaged with the U-slot, which also functions to lock the operating assembly against any free rotation or radial displacement. Thus, one time-sounding mechanism actuation and operation is completed.

The actuation and operation for sounding the quarter-hour and the three-quarter hour will, of course, proceed in the same manner as just described for the half-hour, the difference residing only in the progressive rotary position of cam 55 and hence check-finger 78 and trip-pins 61, 62 and 63. Thus, for the quarter-hour: Trip-pin 61 becomes effective; rider-pin 95 is resting against the first sector of cam 55; check-tongue 99 is radially aligned to cooperate with check element prong 156 and step 160; while the operating assembly shifts to the right the first spur 146 is just ahead of the left edge of lift-tongues 167 and while it shifts back to the left the spur group space 148 is aligned midway with the left edge of the lift-tongues. For the three-quarter-hour: Trip-pin 63 becomes effective; rider pin 95 is resting against the third sector of cam 55; check-tongue 99 is radially aligned to cooperate with check element prong 158 and step 162; while the operating assembly shifts to the right the spur group space 150 is aligned midway with the left edge of lift-tongues 167 and while it shifts back to the left spur group space 151 is aligned midway with the left edge of the lift-tongues.

The operation of the mechanism for sounding the full hour will now be described. With reference first to Figures 11 and 19 let it be assumed that cam 55 has revolved to the point where trip-pin 64 is in effect and rider-pin 95 is resting against the fourth (highest) sector of the cam. In this condition check tongue 99, as partly seen in Figure 15, will be radially aligned to cooperate with check-prong 159. With reference now to Figure 10, when cam 55 is in the rotary position just described the cam 52 will be so positioned that the rider-pin 96 of cam finger 94 will be resting against and substantially in the center of one of the cam sectors. In the present illustration the rider-pin 96 is shown resting against the tenth sector, which corresponds to ten o'clock, and check-tongue 100 of the check-finger 77, as indicated by the broken line with arrowheads, is radially aligned with the tenth tooth of check element 126. Now, when the mechanism is actuated as previously described the operation will proceed as follows: Check element prong 159 will abut check-tongue 99; while the operating assembly shifts to the right spur group space 151 will be aligned with the left edge of lift-tongues 167; after the last spur cluster group has functioned the equally spaced group of hour sounding spurs, which start with spur 152, will function until the tenth spur thereof has operated and passed the left edge of lift-tongues 167; thereupon the tenth tooth of check element 126 will abut check-tongue 100 and the mechanism will be in the condition illustrated in Figure 15; check element 126 and check-tongue 100 will now function in the same manner as described relative to check element 127 and check-tongue 99, the latch 138 (Fig. 1) being similarly released and the tenth tooth of check element 126 traversing the length of and slipping off the toe of check-tongue 100 when the operating assembly has shifted back to the left, and while so shifting the left edge of lift-tongue 167 will stand between and clear of the tenth and eleventh of the hour sounding spurs, as shown; the operating assembly now continues to revolve until the cycle is completed and stopped in the manner previously described.

The system for sounding the time for all of the hours from one o'clock to twelve o'clock should now be readily understood since it will be apparent that each of the twelve sectors of cam 52 successively radially aligns check-tongue 100 with the corresponding one of the twelve teeth of check element 126 which in turn determines how many of the twelve spurs of the hour sounding group will be permitted to function before the operating assembly is checked and shifted back to its ineffective condition.

The operating conditions established by the other positions of selector lever 88 will now be described. Referring first to Figure 16 the cam 85 will be seen in the position in which its tangential face 114 is in abutment with detent tab 188. In this position lever 88 has been set to "Hourly" (Fig. 20) and trip-finger 79 has been axially shifted to the position shown in Figure 8. It will now be apparent that in this condition, when the cam 55 revolves, the trip-pins 61, 62 and 63 will freely bypass the trip-finger and thus leave effective only the longer trip-pin 64, and it will now also be apparent that when lever 88 is thus set the mechanism will be adapted to sound the time only on each hour. And when set in this position the pin 112 in the trip-finger hub bushing moves only in the straight end portion 110 of the shaft recess and, as in the previously described position, it is thus not displaced axially when the finger is rotated for tripping. Also, it will be observed that lever 88 is restrained from any further rotation counterclockwise from its present position, as viewed in Figure 20, by the cam step 118 which is adapted to abut the lower edge of tab 188 when further rotation in such direction is attempted.

Referring now to Figure 18 the cam 85 will be seen in the position in which its tangential face 116 is in abutment with detent tab 188. In this position lever 88 has been set to "Silent" (Fig. 20) and, as will be seen, the rider-tongue 200 of throw-latch 105 is now resting against the radially extended lobe of the release cam 84. At the same time the abutment tab 102 of bell-crank 80 is in abutment with the terminus 189 of detent arm 184 which under the influence of spring 186 has rotated the bell-crank counterclockwise to the position illustrated. In this condition the throw-latch 105 is raised clear of and sustained above catch-tongue 216, as shown, and the bell-crank is rotated and sustained far enough counterclockwise so that the trip-finger 79 is radially clear of and thus non-cooperative with any of the trip-pins 61—64. It will now be apparent that when lever 88 is thus set any operation of the time-sounding mechanism is precluded.

As hereinbefore set forth, when the present device is operated by an electric motor a current interruption indicator element, such as 223, may be provided which will assume the position indicated by the broken lines 232 whenever the current is interrupted. To return the element to the position shown in solid lines after the current is reestablished lever 88 need merely be turned momentarily as far as it will go in the direction of the arrow toward the inscription "Reset Indicator" shown in Figure 20. With this movement of the lever the high point 117 of cam 85 (Fig. 9) will rotate counterclockwise, as viewed in the drawing, and thereby rotate detent arm 184 and hence reset-finger 183 clockwise until the latter has depressed the rear extension of the indicator element as far as it will go, which is to the point where the lower end of aperture 226 abuts the stud 225, as shown in Figure 7.

Certain important features of the time-sounding mechanism actuating elements should now be noted. For example, with the present structure the selector lever 88 may without ill effect be turned and set to "Silent" or any of its other positions while the time-sounding mechanism is in operation or otherwise. As has been shown, when the lever is set to "Silent" the throw-latch 105 is released from and sustained clear of catch-tongue 216, but if the mechanism is in operation and the actuating elements therefore in the condition illustrated in Figure 9 the manual release of the throw-latch will not disturb the keep-latch 190 and thus the latter will obviously continue to function in its normal capacity until the operative cycle is completed in normal manner.

Another feature is that when the selector lever is turned from "Silent" and set to one of its other positions it cannot effect a partial and therefore possibly damaging actuation of the time-sounding mechanism such as could occur if the throw-latch 105 were free to engage catch-tongue 216 when the abutment tab 102 was manually released by the terminus 189 of the detent arm, for if at the time of such manual action one of the trip-pins 61—64 was in such position that it caught and held the trip-finger 79 when it was only part way back to its normal position the throw-latch, if engaged with the catch-tongue, could rotate carrier 204 to corresponding partial engagement of the gears 212 and 60. This is precluded by the raising of the throw-latch by means of cam 84. With this provision when the throw-latch is returned from the condition of "Silent" to its effective conditions it must advance far enough before it is released by cam 84 that its latch point is past the lip of catch-tongue 216, and thus the latch will come to rest on the catch-tongue in the normal position illustrated in Figure 17. It should also be explained that the purpose of rotating bell-crank 80 to the point where the trip-finger 79 is clear of the trip-pins when the selector lever is at "Silent" is to preclude any clicking sounds which might be heard as each trip-pin passed if the trip-finger remained in their path. Otherwise the sustained release of the throw-latch alone would serve to preclude operation of the time-sounding mechanism.

The restraining tab 103 at the top of the bell-crank is provided to preclude any possibility of the throw-latch being in any manner raised or rotated far enough for its latch point at one time or another to pass over instead of coming to rest against the cushioning element of bracket 202.

Still another feature is illustrated in Figure 21. In this it will be seen that the trip-finger 79 is preferably made of a flexible or spring material so that if at any of the times it is manually shifted to the left, as viewed in the drawing, one of the short trip-pins 61, 62 or 63 should happen at the moment to be in its axial path it will simply deflect, as illustrated, until the pin passes and allows it to spring back to its normal straight form and into the functioning radial path of the pins.

For manually adjusting or setting the time the setting knob 72 may be turned in either direction with equal facility, which is to say the time may be set either forward or backward to any extent without ill effect to any of the mechanism. The backward setting is in one respect provided for by the spring 106 associated with trip-finger 79 (Figs. 2, 9 and 19). If the cam 55 is rotated counterclockwise, as viewed in Figure 9, the spring 106 will freely yield each time a trip-pin abuts the trip-finger in such direction and will thus permit the trip-pin to pass without interference.

In the present embodiment of the device the hour sounding spurs are preferably provided on two of the spur-wheels, 123 and 124. This adapts the mechanism to sound a harmonious chord for indication of the hours. However, it will be apparent that the hour sounding spurs can if desired be provided on only one wheel to sound a single note or, with the present system, more than four sonic elements and spur-wheels could be employed and several of the latter might be provided with hour sounding spurs.

Also, in the present embodiment of the device the check-fingers 77 and 78 are shown adapted to cooperate with their respective cams 52 and 55 under the influence of gravity, but it is obvious that the structure might be so designed or arranged that the check-fingers were not disposed for influence by gravity and in such case springs may readily be employed to bias them toward the cams. And, if desired, springs might also be applied in the present structure as additional biasing means.

The guide apertures 181 and 182 (Fig. 4) in which the end portions of check-fingers 77 and 78 respectively are fittingly and slidably disposed serve importantly to keep the fingers so aligned axially that the length of their check-tongues 99 and 100 will be maintained relative to the shift limit in each direction of the check elements 126 and 127. For example, with reference to Figure 5, if check-finger 77 were laterally free at the end it might easily be deflected or distorted so that its check-tongue 100 was displaced to the left and, as will be apparent, in such condition the tongue could remain engaged with the teeth of check element 126 when the operating assembly is shifted as far to the left (where shown) as the shaft recess 143 can shift it. In other words, were it so displaced, the maximum shift of the check element would not move the latter far enough to slip off the toe of the check-tongue and the operating assembly would therewith be rotationally stalled and would stand continuously shifting back and forth with the tooth of the check element caught and riding on the check-tongue 100. Without the end guide the same condition could be effected with check-finger 78, therefore the provision of such lateral restriction is important.

With reference to Figures 11 and 12 it will be seen that when the check-step 161 of element 127 slips off check-tongue 99 the toe of the tongue will become disposed under the offset prong 158 until the prong fully passes over the tongue. This, of course, also occurs with the prongs 157 and 159. If during the moment the check-tongue and one of the prongs was so disposed manual adjustment of the time was undertaken with the setting knob 72 the thus augmented rotation of cam 55 could or would rotate check-finger 78 counterclockwise and thereby raise the check-tongue into abutment with the underside of the offset prong. In such case, if the check-finger 78 and cam-finger 82 were unitary, as is check-finger 77 and cam finger 94, the time adjusting operation would be momentarily restricted, or with strongly applied manual force the check-tongue might become jammed against the prong, or one or both members might be damaged by distortion. To circumvent such a condition the cam finger 82 is movable independently of the check-finger 78 against the bias of the spring 89. With this construction, if the check-tongue comes into abutment with the underside of one of the prongs when the time is being manually adjusted, the spring 89 will yield, allowing cam-finger 82 to move independently if it opposes the augmented rotation of cam 55.

Referring again to spur-wheels 121—124 (Figures 1 and 15), in the present embodiment of my invention, as has been shown and described, the spur groups separated and defined by the spaces 149, 150 and 151 comprise one, two, three and four spur clusters consecutively. As has also been described, each of the spur groups activate the sonic elements to indicate a different one of the quarters of an hour. It should therefore be noted that in the present device each quarter of the hour is distinguished and identified by a different number of soundings according to the number of spurs in each defined group. Moreover, since the spurs on the four wheels may be alternately arranged and spaced on the different wheels in a manner which will activate the sonic elements in a prescribed sequence of the respective sound pitches to which the latter are tuned, each different quarter of the hour may be further distinguished by the sounding of a different melody. And, as will further be apparent, by means of the last (four cluster) group of spurs the present device is also adapted to indicate the full hours with a preceding and distinctive melody and number of soundings followed by the number of regular soundings which indicate the specific hour of the time.

With reference to Figures 4 and 9 attention is directed to the spring tabs 174 which cooperate with the sonic element strikers 165. The angle at which the tabs are set relative to the arcuate travel path of the terminus of fingers 173 is such that when the strikers rebound after striking the sonic elements 242 the spring tabs will effect a frictional resistance against a second though lighter strike through reaction from the rebound. Also, by preloading the spring tabs as hereinbefore described the aforesaid effect can be more accurately established and controlled. Further, since the prime function of the spring tabs is to retract and sustain the striker faces 169 a certain predetermined distance away from the sonic elements when the strikers are at rest the proper adjustment may be readily and positively attained and sustained by providing a relatively rigid abutment element, such as the portion 179 of plate 175, for preloading and positioning the spring tabs. The abutment element can be preformed to a substantially accurate setting, or if it is found to be slightly inaccurate it can be corrected by bending with considerably less difficulty than could an element made of spring material such as the spring tabs themselves.

It should also be noted that with the spring tabs 174 disposed between the plate portion 179 and the guard flange 175 the tabs are protected against being accidentally displaced or bent out of adjustment when the device is being handled for repairs, cleaning, oiling, etc.

With the foregoing description and disclosure of the present embodiment of my invention it will be apparent that whenever the timekeeping mechanism thereof is adjusted or set by the one setting knob 72 the time-sounding mechanism thereof will always be automatically and simultaneously coordinated with such adjustment or setting. Thus, no separate setting means is required to effect such immediate coordination, nor any additional means to automatically effect coordination after elapse of some period of time.

Although in the structure of the present embodiment of my invention the time-sounding selector lever 88 and the elements it operates are adapted to provide only a choice of either the full complement of time-sounding or the full hours alone (aside from "Silent"), provision can readily be made whereby with one more setting position of the selector lever time-sounding of the hour and the half-hour as a combination could be effected. To accomplish this only three revisions would be required, namely: Shaft recess 109—111 would continue further around the shaft annulus and be formed with three radially straight portions adjoined by two angular portions; half-hour trip-pin 62 would be lengthened by about one-half the difference between its present length and the length of hour trip-pin 64; detent cam 85 would be formed with a fourth tangential face. With only these three revisions three different time-sounding settings plus "Silent" would be selectable.

While it will be apparent that the illustrated embodiment of my invention herein disclosed and described is well calculated to adequately fulfill the objects and advantages primarily stated, it is to be understood that the invention is susceptible to variation, modification and change within the spirit and scope of the subjoined claims.

Having now described my invention, what I claim is:

1. In a time indicating device, timekeeping and time-sounding mechanism comprising a main shaft, a single countershaft, a time-sounding mechanism control member shaft, a time-sounding mechanism spur-wheel shaft, supporting and journalling means for said shafts, prime moving means adapted to revolve said main shaft at one revolution per minute, a first gear secured to said main shaft and enmeshed with a second gear freely journalled on said counter-shaft, a third gear secured to said second gear and enmeshed with a fourth gear frictionally secured to an element journalled on said main shaft and which element is by said gears revolved at one revolution per hour, a fifth gear secured to said element and enmeshed with a sixth gear secured to said countershaft, a seventh gear secured to said countershaft and enmeshed with an eighth and last gear secured to another element journalled on first said element and which second said element is by said gears revolved at one revolution per twelve hours, a pair of control fingers pivotally supported on said control member shaft, a cam secured to the first said element and cooperative with one of said control fingers whereby to change the radial position of the latter once each quarter of an hour, a cam secured to the second said element and cooperative with the other of said control fingers whereby to change the radial position of the latter once each hour, a plurality of time-sounding spur-wheels journally supported on said spur-wheel shaft and adapted to be rotated by the latter and axially shifted thereon, a plurality of time-sounding strikers actuatable by said spur-wheels, sonic elements cooperative with said strikers, automatic tripping means, means whereby the tripping means is normally actuated at predetermined intervals, elements actuatable by the tripping means to effect a driving connection with said prime moving means whereby the said spur-wheel shaft and therewith the spur-wheels are normally set to rotating once each quarter of an hour, means including said control fingers and an angular recess in the spur-wheel shaft whereby during the rotation of the latter shaft the spur-wheels are at certain rotational stages axially shifted from an ineffective position to a time-sounding effective position and whereby after effectively functioning they are shifted back to an ineffective position, and means whereby the rotation of said spur-wheels is limited to and stopped at their rotational starting point upon completion of a prescribed functional cycle.

2. A structure as defined in claim 1 wherein the said tripping means comprises a trip-finger pivotally supported on the said control member shaft.

3. The structure defined in claim 2 including trip-pins secured to the first said cam which pins are adapted to cooperate with the said trip-finger.

4. The structure defined in claim 1 including detent means adapted to positively sustain said spur-wheels at their rotational cycle starting and stopping point until they are set in motion by the designated tripping and driving means.

5. The structure defined in claim 1 including a latch operable to positively drivingly engage the said spur-wheels to the spur-wheels shaft, and means including the said control fingers whereby the latch is released to permit the axial shift of the spur-wheels and whereby the latch becomes reengaged upon the completion of each such shift in either direction.

6. The structure defined in claim 1 including manually operable selecting mechanism and selecting means associated with the said control member shaft whereby the time-sounding mechanism may be selectively adjusted and set to function at intervals of less than one hour, or at intervals of one hour, or to remain inoperative.

7. In a time indicating device comprising time-sounding mechanism: a time-sounding mechanism control member shaft, a time-sounding mechanism spur-wheel shaft, prime moving means, a cam driven at a speed of one revolution per hour by the prime moving means, another cam driven at a speed of one revolution per twelve hours by the prime moving means, a pair of control fingers pivotally supported on said control member shaft, means whereby the radial position of one of the control fingers is changed once each quarter of an hour by the first said cam, means whereby the radial position of the other control finger is changed once each hour by the second said cam, a plurality of time-sounding spur-wheels journally supported on said spur-wheel shaft and adapted to be rotated therewith and axially shifted thereon, a plurality of time-sounding strikers actuatable by said spur-wheels, sonic elements cooperative with said strikers, automatic tripping means, means whereby the tripping means is normally actuated at predetermined intervals, elements actuatable by the tripping means to effect a driving connection with said prime moving means whereby the said spur-wheel shaft and therewith the spur-wheels may be set into rotation, means including said control fingers and an angular recess in the spur-wheel shaft whereby during the rotation of the latter shaft the spur-wheels are at certain rotational stages axially shifted from an ineffective position to a time-sounding effective position and whereby after effectively functioning they are shifted back to an ineffective position, and means whereby the rotation of said spur-wheels is limited to and stopped at their rotational starting point upon completion of a predetermined functional cycle.

8. A structure as defined in claim 7 wherein the said tripping means comprises a trip-finger pivotally supported on the said control member shaft.

9. The structure defined in claim 8 including trip-pins secured to the first said cam which pins are adapted to cooperate with the said trip-finger.

10. The structure defined in claim 7 including detent means adapted to positively sustain said spur-wheels at their rotational cycle starting and stopping point until they are set in motion by the designated tripping and driving means.

11. The structure defined in claim 7 including a latch operable to positively drivingly engage the said spur-wheels to the spur-wheel shaft, and means including the said control fingers whereby the latch is released to permit the axial shift of the spur-wheels and whereby the latch becomes reengaged upon the completion of each such shift in either direction.

12. The structure defined in claim 7 including manually operable selecting means associated with the said control member shaft whereby the time-sounding mechanism may be selectively adjusted and set to function at intervals of less than one hour, or at intervals of one hour, or to remain inoperative.

13. In a device for indicating time by sound, an element activatable to produce sound, a normally stationary rotatable element operable to activate the sound producing element, a rotatable axial support for said rotatable element whereon the latter is axial shiftable, a prime mover, means actuatable by the prime mover to automatically set the rotatable element into motion at prescribed time intervals, means whereby after it is set into motion the rotatable element is shifted from one axial position to another, and means whereby when the rotatable element is shifted to one axial position it is rendered effective to activate the sound producing element and whereby when it is shifted to another axial position it is rendered thus ineffective.

14. The structure defined in claim 13 including a member movable to different positions to effect the shift of the said rotatable element at different prescribed rotational stages of the latter, and means driven by the prime mover whereby said member is automatically moved to said different positions responsive to elapse of predetermined time intervals.

15. The structure defined in claim 13 including a plurality of members each movable to different positions to effect the shift of the said rotatable element at different prescribed rotational stages of the latter, and means driven by the prime mover whereby said members are automatically moved to said different positions responsive to elapse of predetermined time intervals.

16. The structure defined in claim 13 including a manually operable control element selectively settable to different prescribed positions, means whereby when the control element is set to one position the said rotatable element is adapted to activate the sound producing element at intervals of less than one hour, means whereby when the control element is set to another position the rotatable element is adapted to activate the sound producing element only at intervals of one hour, and means whereby when the control element is set to still another position any activation of the sound producing element is precluded.

17. In a device for indicating time by sound, a plurality of elements activatable to produce sound each of which is tuned to a different sound pitch, a normally stationary rotatable element operable to activate the sound producing elements, a rotatable axial support for the rotatable element whereon the latter is axial shiftable, a prime mover, means actuatable by the prime mover to automatically set the rotatable element into motion at prescribed time intervals, means whereby after it is set into motion the rotatable element is shifted from one axial position to another, means whereby when the rotatable element is shifted to one axial position it is rendered effective to activate the sound producing elements and whereby when it is shifted to another axial position it is rendered thus ineffective, and means whereby when it is rendered effective the rotatable element operates to activate the sound producing elements selectively in a prescribed sequence of their said sound pitches.

18. The structure defined in claim 17 including a member movable to different positions to effect the shift of the said rotatable element at different prescribed rotational stages of the latter, and means driven by the prime mover whereby the said member is automatically moved to said different positions responsive to elapse of predetermined time intervals.

19. The structure defined in claim 17 including a plurality of members each movable to different positions to effect the shift of the said rotatable element at different prescribed rotational stages of the latter, and means driven by the prime mover whereby said members are automatically moved to said different positions responsive to elapse of predetermined time intervals.

20. The structure defined in claim 17 including a manually operable control element selectively settable to different prescribed positions, means whereby when the control element is set to one position the said rotatable element is adapted to activate the sound producing elements at intervals of less than one hour, means whereby when the control element is set to another position the rotatable element is adapted to activate the sound producing elements only at intervals of one hour, and means whereby when the control element is set to still another position any activation of the sound producing elements is precluded.

21. In a device for indicating time by sound, an element activatable to produce sound, a normally stationary movable element operable to activate the sound producing element, means whereby said movable element is movable in one plane of motion for activation of the sound producing element, means whereby the said movable element is shiftable laterally relative to said plane of motion to positions which render it effective or ineffective to activate the sound producing element, prime moving means and means actuatable thereby to automatically set the movable element into motion at prescribed time intervals, means whereby after it is set into motion the movable element is first shifted laterally to its effective position, means whereby activation of the sound producing element is then effected, and means whereby activation of the sound producing element is concluded at a prescribed stage by means which shifts the movable element back to its ineffective position.

22. In a device for indicating time by sound, a plurality of elements activatable to produce sound each of which is tuned to a different sound pitch, a normally stationary movable element operable to activate the sound producing elements, means whereby said movable element is movable in one plane of motion for activation of the sound producing elements, means whereby said movable element is shiftable laterally relative to said plane of motion to positions which render it effective or ineffective to activate the sound producing elements, prime moving means and means actuatable thereby to automatically set the movable element into motion at prescribed time intervals, means whereby after it is set into motion the movable element is first shifted laterally to its effective position, means whereby activation of the sound producing elements is then effected, means whereby activation of the sound producing elements is concluded at a prescribed stage by means which shifts the movable element back to its ineffective position, and means whereby when it is rendered effective the movable element operates to activate the sound producing elements selectively in a prescribed sequence of their said sound pitches.

23. In a time indicating device, timekeeping mechanism and periodically operable time-sounding mechanism, an element activatable by the time-sounding mechanism to produce sound, prime moving means, means motivated by the prime moving means to automatically operate the time-sounding mechanism at prescribed time intervals, elements incorporated in the time-sounding mechanism by which in a full operation it is adapted to activate the sound producing element twelve consecutive times, means for limiting such activation of the sound producing element to any number from one to twelve soundings, the last said means comprising a control element connected to the timekeeping mechanism and movable to twelve different conditions, and a cooperative arresting element connected to the time-sounding mechanism and provided with a plurality of projections each corresponding to one of the twelve conditions of the control element, means motivated by the prime moving means to automatically and progressively move the control element to a different one of its twelve conditions once each hour, means whereby each condition defines a predetermined number of soundings of the activatable element, and means whereby the sound activating operation of the time-sounding mechanism is arrested by cooperation of the control element and the arresting element after sounding such number of times as the condition of the control element determines.

24. In a time indicating device, timekeeping mechanism and periodically operable time-sounding mechanism, an element activatable by the time-sounding mechanism to produce sound, prime moving means, means motivated by the prime moving means to automatically operate the time-sounding mechanism at intervals of one-quarter of an hour, elements incorporated in the time-sounding mechanism by which it is adapted to activate the sound producing element a different prescribed number of consecutive times to indicate each quarter of the hour and by which in a full operation it is adapted to activate the sound producing element twelve consecutive times to indicate the full hours, means for controlling the activation of the sound producing element for each quarter of the hour and for limiting the activation of the sound producing element to any number from one to twelve soundings to indicate the full hours, the last said means comprising a control element connected to the timekeeping mechanism and movable to four different conditions and another control element connected to the timekeeping mechanism and movable to twelve different conditions, cooperative arresting elements connected to the time-sounding mechanism and provided with a plurality of projections each corresponding to one of the different conditions of the control elements, means motivated by the prime moving means to automatically and progressively move the first said control element to a different one of its four conditions once each quarter of an hour and the second said control element to a different one of its twelve conditions once each hour, means whereby each condition of the control elements defines a predetermined number of soundings of the activatable element, and means whereby the sound activating operation of the time-sounding mechanism is arrested by cooperation of one or the other of the control elements and an arresting element after sounding such number of times as the condition of the control elements determine.

25. In a time indicating device, timekeeping mechanism and periodically operable time-sounding mechanism, a plurality of elements activatable to produce sound each of which is tuned to a different sound pitch, prime moving means, means motivated by the prime moving means to automatically set the time-sounding mechanism into operation upon elapse of certain prescribed time intervals, means whereby when in operation the time-sounding mechanism activates the sound producing elements in a prescribed sequence of their sound pitches, elements incorporated in the time sounding mechanism by which it is adapted to activate the sound producing elements a different prescribed number of times to indicate the elapse of different ones of the certain prescribed time intervals, a control element connected to the timekeeping mechanism and movable to different conditions, a cooperative arresting element connected to the time-sounding mechanism and provided with a plurality of projections each corresponding to a different one of the conditions of the control element, means associated with the prime moving means by which the control element is automatically and progressively moved to different conditions, means whereby each condition of the control element defines a predetermined number of soundings of the activatable elements, and means whereby the sound activating operation of the time-sounding mechanism is arrested by cooperation of the control element and a projection of the arresting element after sounding such number of times as the condition of the control element determines.

26. The structure defined in claim 23 including manually operable setting means to adjust the time indicated by the device, and cooperative means whereby the said control element is by the setting means immediately moved in coordination with such adjustment thereby.

27. The structure defined in claim 24 including manually operable setting means to adjust the time indicated by the device, and cooperative means whereby both of the said control elements are by the setting means immediately moved in coordination with such adjustment thereby.

28. The structure defined in claim 25 including manually operable setting means to adjust the time intervals indicated by the device, and cooperative means whereby the said control element is by the setting means immediately moved in coordination with such adjustment thereby.

29. In a time indicating device, prime moving means, mechanism movable by the prime moving means to indicate time by sound, elements activatable by said mechanism to produce sound, means whereby said mechanism is automatically set into motion at prescribed time intervals, elements incorporated in said mechanism whereby it is adapted to activate the sound producing elements to indicate the elapse of time intervals of less than one hour, elements incorporated in said mechanism whereby it is adapted to activate the sound producing elements to indicate the elapse of successive one hour intervals, movable primary control means for said mechanism, means whereby the primary control means is moved at a timed rate by the prime moving means, elements associated with the primary control means whereby in its movement it provides twelve different conditions each of which defines an hour interval and a plurality of other conditions each of which define intervals of less than one hour, means whereby each of the said conditions also defines a predetermined number of sound activating operations of the operable mechanism, secondary control means connected to and moved in unison with said mechanism, and cooperating means whereby the secondary control means comes into abutment with the primary control means to arrest the sound activating operation of the movable mechanism after it sounds such number of times as the condition of the primary control means determines.

30. In a device for indicating time by sound, prime moving means, sound producing means, operable elements drivably connectible to the prime moving means to activate the sound producing means, means whereby said operable elements are periodically and automatically so connected, a main connecting element movable to effect such driving connection, an independently movable auxiliary element associated with said main connecting element which is moved in unison with the latter for effecting said connection, an actuating element engageable with said auxiliary element and adapted to move the latter and therewith the main connecting element to its connection effecting condition, a latching element automatically engageable with the auxiliary element whereby to maintain the latter and therewith the connecting element in its connection effecting condition, primary releasing means associated with said operable elements adapted to disengage said actuating element and said latching element upon completion of a prescribed operation by the operable elements, secondary releasing means also associated with said operable elements adapted break the driving connection with the latter upon further prescribed operation thereof, means whereby upon effect of the primary releasing means the said auxiliary element is disengaged and independently moved to its released condition, means whereby when it is thus released the auxiliary element maintains the disengagement of the actuating element and the latching element, and means whereby the driving connection effected by the main connecting element is sustained until release is effected by the secondary releasing means.

31. The structure defined in claim 30 including a spring element adapted to bias the said main connecting elements and the auxiliary element toward their released condition, and means whereby one spring element commonly serves to so bias both the said connecting element and the auxiliary element.

32. The structure defined in claim 30 including a spring adapted to bias the said actuating element and the latching element toward engagement and to bias the said main connecting element toward its connection effecting condition, and means whereby one spring commonly serves to so bias the said elements.

33. In a device for indicating time by sound, prime moving means, sound producing means, automatically operable means to activate the sound producing means, means whereby said operable means is potentially adapted to activate the sound producing means to indicate the time at intervals of one hour and at intervals of less than one hour, means also potentially adapted to prohibit any activation of the sound producing means, selective control means comprising a single manually operable control element selectively settable to different positions, means whereby when the control element is set to one position activation of the sound producing means occurs at intervals of less than one hour, means whereby when the control element is set to another position activation of the sound producing means occurs only at intervals of one hour, and means whereby when the control element is set to still another position any activation of the sound producing means is prohibited.

34. A device as defined in claim 33 wherein the said automatically operable means is set into operation by means of an engageable latch and wherein said selective control means comprises a rotatable cam which operates to prevent engagement of the latch when the control element is set to the last described position.

35. The device defined in claim 33 including a tripping element actuatable to set the automatically operable means into operation, a shaft whereon the tripping element is supported, and means whereby the tripping element is axially shifted to different positions on said shaft in response to and in accordance with the setting of the said control element from one position to another.

36. In a time indicating device comprising time-sounding means, prime moving means, sound producing means, activating means operably connectible to the prime moving means to activate the sound producing means, a connecting element periodically automatically movable to operably connect the activating means, a fixed element, means whereby the movement of the connecting element is arrested by said fixed element at a prescribed connection effecting status, a movable biasing element engageable with the connecting element to move the latter to its connection effecting status, means for engaging and releasing the biasing element, means whereby the engaging movement of the biasing element is arrested by said fixed element at a prescribed engagement stage, means whereby upon its release the biasing element is influenced to move further in its connection biasing direction, means whereby the further movement of the biasing element is arrested by said fixed element at a prescribed status, a movable latching element engageable with the connecting element to positively sustain the latter in its connection effecting status, means for engaging and releasing the latching element, and means whereby the engaging movement of the latching element also is arrested by said fixed element at a prescribed engagement stage, one fixed element thereby serving commonly for all of the designated purposes.

37. A structure as defined in claim 36 wherein the said fixed element comprises a cushioning element whereon and by which the various said movable elements are arrested.

38. In a device for indicating time by sound, prime moving means, sound producing means, activating means operably connectible to the prime moving means to activate the sound producing means, a connecting element periodically automatically movable to operably connect the activating means, an actuating spring, an actuating element engageable with the connecting element, means whereby the actuating element is engagingly biased by said spring, means whereby the actuating element is operable to bias the connecting element to its connection effecting condition, means whereby the connecting element is biased to its connection effecting condition by said spring, a latching element engageable to sustain the connecting element in its connection effecting condition, and means whereby the latching element also is engagingly biased by said spring, one spring thereby serving commonly for all of the designated biasing effects.

39. In a device for indicating time by sound, sound producing means, prime moving means, controllable means operable to actuate the sound producing means, means associated with the prime moving means whereby the controllable means is periodically automatically set into operation, an elongated control element pivotally supported at one end, means whereby the control element is rotated to various positions on its pivotal support to control the controllable means, and means comprising a fixed slotted guide element whereby the terminus of the control element remote from the pivotal support is substantially restrained from any displacement in an axial direction.

40. In a time indicating device comprising timekeeping and time-sounding mechanism, prime moving means, sound producing means, a controllable element movable to activate the sound producing means, means motivated by the prime moving means whereby the controllable element is automatically set into motion at intervals of one hour and at intervals of less than one hour, means whereby when in motion the controllable element may be rendered effective or ineffective to activate the sound producing means, means whereby the controllable element is adapted to be successively moved in three directions, means whereby the controllable element is first moved in one direction whereafter it is potentially adapted to activate the sound producing means, means whereby the controllable element is next moved in another direction and wherewith during its movement in such direction it effectively activates the sound producing means, means whereby after effectively functioning the controllable element is moved in another direction wherewith it is rendered ineffective to activate the sound producing means, camming means associated with the timekeeping mechanism adapted to control the movements of the controllable element and to thereby render it effective or ineffective when in motion, means whereby the camming element is movable to different conditions which when the controllable element is in motion render the latter effective for different periods of time at intervals of one hour and for still other periods of time at intervals of less than one hour, and means whereby the controllable element is successively moved in said three directions each time it is set into motion to activate the sound producing means at the intervals of one hour or at the intervals of less than one hour.

41. In a time indicating device, timekeeping mechanism and periodically effectively operable time-sounding mechanism, means to automatically set the time-sounding mechanism into effective operation at prescribed time intervals, a pair of rotatable cams connected to the timekeeping mechanism and each adapted to provide a plurality of cam elevational conditions from the cam rotational axis, means to rotate the cams progressively to different elevational conditions relative to a fixed point, a pair of rotatable arresting elements connected to the time-sounding mechanism and each provided with a plurality of angularly spaced teeth and each tooth progressively extending a different radial distance from the element rotational axis, means whereby each elevational condition of each cam cooperationally corresponds with a coinciding tooth of one element or the other, means to effect cooperation between a cam and an arresting element at the different cam elevational conditions, and means whereby the effective operation of the time-sounding mechanism is arrested when said cooperation is effected.

42. In a time indicating device, timekeeping mechanism and periodically effectively operable time-sounding mechanism, means to automatically set the time-sounding mechanism into effective operation at prescribed time intervals, a rotatable cam connected to the timekeeping mechanism and adapted to provide a plurality of cam elevational conditions from the cam rotational axis, means to rotate the cam progressively to different elevational conditions relative to a fixed point, a rotatable arresting element connected to the time-sounding mechanism and provided with a plurality of angularly spaced teeth and each tooth progressively extending a different radial distance from the element rotational axis, means whereby each elevational condition of the cam cooperationally corresponds with a coinciding tooth of the element, means to effect cooperation between the cam and the element at the different cam elevational conditions, and means whereby the effective operation of the time-sounding mechanism is arrested when said cooperation is effected.

43. In a time indicating device, timekeeping mechanism and periodically effectively operable time-sounding mechanism, means to automatically set the time-sounding mechanism into effective operation at prescribed time intervals, a pair of time-sounding mechanism control elements connected to the timekeeping mechanism and each progressively rotatable to a plurality of different control conditions, means to progressively rotate the control elements to their different control conditions, a pair of rotatable arresting elements connected to the time-sounding mechanism and each provided with a plurality of angularly spaced teeth and each tooth progressively extending a different radial distance from the element rotational axis, means whereby each condition of each control element cooperationally corresponds with a coinciding tooth of one arresting element or the other, means to effect cooperation between a control element and an arresting element at the different control conditions, and means whereby the effective operation of the time-sounding mechanism is arrested when said cooperation is effected.

44. In a time indicating device, timekeeping mechanism and periodically effectively operable time-sounding mechanism, means to automatically set the time-sounding mechanism into effective operation at prescribed time intervals, a time-sounding mechanism control element connected to the timekeeping mechanism and progressively rotatable to a plurality of different control conditions, means to progressively rotate the control element to its different control conditions, a rotatable arresting element connected to the time-sounding mechanism and provided with a plurality of angularly spaced teeth and each tooth extending a different radial distance from the element rotational axis, means whereby each condition of the control element cooperationally corresponds with a coinciding tooth of the arresting element, means to effect cooperation between the control element and the arresting element at the different control conditions, and means whereby the effective operation of the time-sounding mechanism is arrested when said cooperation is effected.

45. In a time indicating device, timekeeping mechanism and movable time-sounding mechanism, prime moving means and means actuated thereby to periodically set the time-sounding mechanism into motion and to render it effective or ineffective to produce sound, the last said means comprising a primary control element connected to the timekeeping mechanism and moved thereby to various control conditions, a secondary control element connected to and moved in unison with the time-sounding mechanism, means whereby portions of the secondary control element are adapted to come into abutment with the primary control element at prescribed stages of the movement of the time-sounding mechanism, means to effect such abutment at prescribed control conditions of the primary control element, means whereby upon abutment of one portion of the secondary control element with the primary control element the time-sounding mechanism is rendered effective to produce sound and whereby upon abutment of another portion of the secondary control element with the primary control element the time-sounding mechanism is rendered ineffective to produce sound.

46. In a device for automatically indicating time by sound, prime moving means, elements driven at a timed rate by the prime moving means, a percussion element adapted to produce sound when struck, an elongated striking element pivotally supported at one end and provided with a weighted striking head at its opposite end, means by which the striking element is periodically automatically actuated to cause its striking head to strike the percussion element, means by which after each such strike the striking head is immediately moved away from and sustained out of contact with the percussion element until it is again actuated, the last said means comprising a spring biasing element disposed to cooperate with and react against a portion of the striking element, a substantially rigid support for the spring biasing element, a stationary element disposed in abutment against a portion of the spring biasing element, and means by which the spring biasing element is sustained prestressed to a prescribed degree by its abutment against the stationary element.

References Cited in the file of this patent

UNITED STATES PATENTS

| | | |
|---|---|---|
| 909,298 | Herschede | Jan. 12, 1909 |
| 1,220,851 | Jacques | Mar. 27, 1917 |
| 1,300,309 | Wehinger | Apr. 15, 1919 |
| 1,383,500 | Vasey et al. | July 5, 1921 |
| 1,468,267 | Johnston et al. | Sept. 18, 1923 |
| 1,960,521 | Wick | May 29, 1934 |
| 2,224,085 | Norton | Dec. 3, 1940 |
| 2,241,447 | Demonet | May 13, 1941 |
| 2,244,332 | Finney et al. | June 3, 1941 |
| 2,384,581 | Wiedemeier | Sept. 11, 1945 |

FOREIGN PATENTS

| | | |
|---|---|---|
| 172,605 | Great Britain | July 20, 1922 |
| 411,139 | Great Britain | June 1, 1934 |
| 788,346 | France | July 29, 1935 |